United States Patent
Bokkes et al.

(10) Patent No.: US 11,858,217 B2
(45) Date of Patent: Jan. 2, 2024

(54) METHODS OF DETERMINING AN INTERLACE PATH FOR AN ADDITIVE MANUFACTURING MACHINE

(71) Applicant: Concept Laser GmbH, Lichtenfels (DE)

(72) Inventors: Tobias Bokkes, Untersiemau (DE); Patrick Dueck, Lichtenfels (DE); Kai Hertel, Breitengussbach (DE); Peter Pontiller-Schymura, Kulmbach (DE); Christian Wacker, Bamberg (DE)

(73) Assignee: Concept Laser GmbH, Lichtenfels (DE)

( * ) Notice: Subject to any disclaimer, the term of this patent is extended or adjusted under 35 U.S.C. 154(b) by 201 days.

(21) Appl. No.: 17/459,046

(22) Filed: Aug. 27, 2021

(65) Prior Publication Data
US 2022/0080674 A1    Mar. 17, 2022

Related U.S. Application Data
(60) Provisional application No. 63/079,534, filed on Sep. 17, 2020.

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/153* (2017.08); *B29C 64/277* (2017.08);
(Continued)

(58) Field of Classification Search
CPC .................................................. B29C 64/393
See application file for complete search history.

(56) References Cited

U.S. PATENT DOCUMENTS

| | | | |
|---|---|---|---|
| 4,908,494 | A | 3/1990 | Faiz et al. |
| 6,833,234 | B1 | 12/2004 | Bloomstein et al. |
| (Continued) | | | |

FOREIGN PATENT DOCUMENTS

| | | | | |
|---|---|---|---|---|
| CN | 107498052 B | | 3/2019 | |
| EP | 3552802 A1 | * | 10/2019 | ......... B23K 15/0086 |

OTHER PUBLICATIONS

Laparra, "Pathfinding Algorithms In Graphs And Applications", Sep. 19, 2019, pp. 1-39, http://diposit.ub.edu/dspace/handle/2445/140466.

*Primary Examiner* — Suresh Suryawanshi
(74) *Attorney, Agent, or Firm* — Dority & Manning, P.A.

(57) ABSTRACT

A method of additively manufacturing an object may include defining an interlace path for a plurality of energy beams from an energy beam system based at least in part on a route-finding algorithm. The interlace path may delineate a first contour zone of a build plane assigned to a first one of the plurality of energy beams from a second contour zone of the build plane assigned to a second one of the plurality of energy beams. An exemplary method may additionally or alternatively include outputting a control command based at least in part on the interlace path. The control command may be configured to cause the energy beam system to irradiate a layer of a powder bed with the plurality of energy beams.

20 Claims, 16 Drawing Sheets

(51) Int. Cl.
  *B29C 64/153*   (2017.01)
  *B29C 64/277*   (2017.01)
  *G06F 17/17*    (2006.01)
  *B33Y 10/00*    (2015.01)
  *B33Y 30/00*    (2015.01)

(52) U.S. Cl.
  CPC ............ *B33Y 50/02* (2014.12); *G06F 17/175* (2013.01); *B33Y 10/00* (2014.12); *B33Y 30/00* (2014.12)

(56) References Cited

U.S. PATENT DOCUMENTS

| | | |
|---|---|---|
| 7,755,657 B2 | 7/2010 | Sandstrom et al. |
| 9,025,136 B2 | 5/2015 | Chen et al. |
| 9,156,194 B2 | 10/2015 | Ng et al. |
| 9,451,873 B1 | 9/2016 | Kopelman et al. |
| 9,950,474 B2 | 4/2018 | Batchelder |
| 10,338,569 B2 | 7/2019 | Crear et al. |
| 2017/0014904 A1* | 1/2017 | Brown .................. B22F 10/366 |
| 2018/0071986 A1* | 3/2018 | Buller .................... B28B 1/001 |
| 2019/0056714 A1 | 2/2019 | Crear et al. |
| 2019/0315053 A1* | 10/2019 | Voigt .................... B33Y 10/00 |
| 2020/0130279 A1* | 4/2020 | Dicken ................ B23K 26/067 |

* cited by examiner

METHODS OF DETERMINING AN INTERLACE PATH FOR AN ADDITIVE MANUFACTURING MACHINE

CROSS-REFERENCE TO RELATED APPLICATION

This application claims priority to U.S. Provisional App. Ser. No. 63/079,534, filed Sep. 17, 2020, the contents of which is incorporated herein by reference in its entirety as if set forth verbatim.

FIELD

The present disclosure generally pertains to additive manufacturing machines and systems and methods pertaining thereto.

BACKGROUND

An additive manufacturing machine may utilize one or more energy beams to additively manufacture objects. When an additive manufacturing machine utilizes a plurality of energy beams, it is important for the respective energy beam to operation in cooperation with one another. For example, a plurality of energy beams may be assigned to irradiate a respective portion of a build plane, and the respective energy beams may follow an interlace path with one another that generally defines a boundary between the portions of the build plane assigned to the respective energy beams. The location of the interlace path may impact various parameters associated with the additive manufacturing process, including irradiation parameters, object parameters, and/or production parameters. For example, one location for an interlace path may be good for purposes of productivity, whereas another location for an interlace path may be good for purposes of quality. Additionally, it may be desirable to prioritize one parameter over another, such as quality over productivity, or vice-versa, depending on various circumstances.

Accordingly, there exists a need for improved methods of defining an interlace path for additive manufacturing machines that utilize a plurality of energy beams.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 1B schematically depicts an object slice superimposed on the build plan of FIG. 10A;

Figure 1:
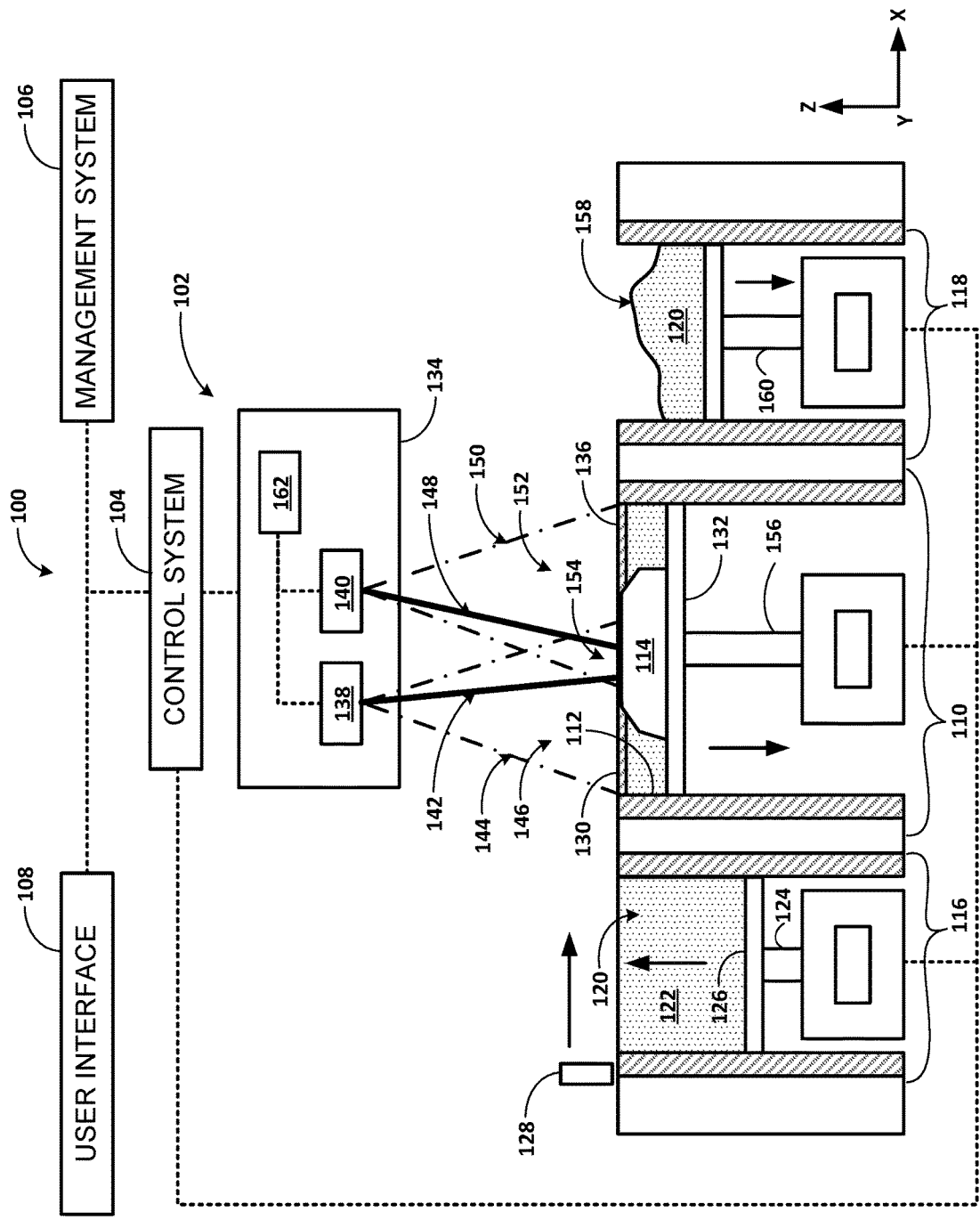
FIG. 1 schematically depicts an exemplary additive manufacturing system.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As described herein, exemplary embodiments of the present subject matter involve the use of additive manufacturing machines or methods. As used herein, the term "additive manufacturing" refers generally to manufacturing technology in which components are manufactured in a layer-by-layer manner. An exemplary additive manufacturing machine may be configured to utilize any desired additive manufacturing technology. In an exemplary embodiment, the additive manufacturing machine may utilize an additive manufacturing technology that includes a powder bed fusion (PBF) technology, such as a direct metal laser melting (DMLM) technology, an electron beam melting (EBM) technology, an electron beam sintering (EBS) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional components. Additively manufactured objects are generally monolithic in nature, and may have a variety of integral sub-components.

Additionally or alternatively suitable additive manufacturing technologies include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Stereolithography (SLA) technology, and other additive manufacturing technology that utilizes an energy beam.

Additive manufacturing technology may generally be described as enabling fabrication of complex objects by building objects point-by-point, layer-by-layer, typically in a vertical direction; however, other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form. Each successive layer may be, for example, between about 10 μm and 200 μm, although the thickness may be selected based on any number of parameters and may be any suitable size according to alternative embodiments.

As used herein, the term "build plane" refers to a plane defined by a surface upon which an energy beam impinges during an additive manufacturing process. Generally, the surface of a powder bed defines the build plane; however, prior to distributing powder material across a build module, a build plate that supports the powder bed generally defines the build plane.

Exemplary embodiments of the present disclosure will now be described in further detail. FIG. 1 schematically depicts an exemplary additive manufacturing system 100.

The additive manufacturing system 100 may include one or more additive manufacturing machines 102. The one or more additive manufacturing machines 102 may include a control system 104. The control system may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or objects 114 may be additively manufactured. In some embodiments, an additive manufacturing machine 102 may include a powder module 116 and/or an overflow module 118. The build module 110, the powder module 116, and/or the overflow module 118 may be provided in the form of modular containers configured to be installed into and removed from the additive manufacturing machine 102 such as in an assembly-line process. Additionally, or in the alternative, the build module 110, the powder module 116, and/or the overflow module 118 may define a fixed componentry of the additive manufacturing machine 102.

The powder module 116 contains a supply of powder material 120 housed within a supply chamber 122. The powder module 116 includes a powder piston 124 that elevates a powder floor 126 during operation of the additive manufacturing machine 102. As the powder floor 126 elevates, a portion of the powder material 120 is forced out of the powder module 116. A recoater 128 such as a blade or roller sequentially distributes thin layers of powder material 120 across a build plane 130 above the build module 110. A build platform 132 supports the sequential layers of powder material 120 distributed across the build plane 130.

The additive manufacturing machine 102 includes an energy beam system 134 configured to generate a plurality of energy beams such as laser beams or electron beams, and to direct the respective energy beams onto the build plane 130 to selectively solidify respective portions of the powder bed 136 defining the build plane 130. As the respective energy beams selectively melt or fuse the sequential layers of powder material 120 that define the powder bed 136, the object 114 begins to take shape. Typically with a DMLM, EBM, or SLM system, the powder material 120 is fully melted, with respective layers being melted or re-melted with respective passes of the energy beams. Conversely, with DMLS or SLS systems, typically the layers of powder material 120 are sintered, fusing particles of powder material 120 to one another generally without reaching the melting point of the powder material 120. The energy beam system 134 may include componentry integrated as part of the additive manufacturing machine 102 and/or componentry that is provided separately from the additive manufacturing machine 102.

The energy beam system 134 may include one or more irradiation devices configured to generate a plurality of energy beams and to direct the energy beams upon the build plane 130. For the embodiment shown in FIG. 1, the energy beam system 134 includes a first irradiation device 138 and a second irradiation device 140. In other embodiments, an energy beam system 134 may include three, four, six, eight, ten, or more irradiation devices. The plurality of irradiation devise may be configured to respectively generate one or more energy beams that are respectively scannable within a scan field incident upon at least a portion of the build plane 130. For example, the first irradiation device 138 may generate a first energy beam 142 that is scannable within a first scan field 144 incident upon at least a first build plane region 146. The second irradiation device 140 may generate a second energy beam 148 that is scannable within a second scan field 150 incident upon at least a second build plane region 152. The first scan field 144 and the second scan field 150 may overlap such that the first build plane region 146 scannable by the first energy beam 142 overlaps with the second build plane region 152 scannable by the second energy beam 148. The overlapping portion of the first build plane region 146 and the second build plane region 152 may sometimes be referred to as an interlace region 154. Portions of the powder bed 136 to be irradiated within the interlace region 154 may be irradiated by the first energy beam 142 and/or the second energy beam 148 in accordance with the present disclosure.

To irradiate a layer of the powder bed 136, the one or more irradiation devices (e.g., the first irradiation device 138 and the second irradiation device 140) respectively direct the plurality of energy beams (e.g., the first energy beam 142 and the second energy beam 148) across the respective portions of the build plane (e.g., the first build plane region 146 and the second build plane region 152) to melt or fuse the portions of the powder material 120 that are to become part of the object 114. The first layer or series of layers of the powder bed 136 are typically melted or fused to the build platform 132, and then sequential layers of the powder bed 136 are melted or fused to one another to additively manufacture the object 114.

As sequential layers of the powder bed 136 are melted or fused to one another, a build piston 156 gradually lowers the build platform 132 to make room for the recoater 128 to distribute sequential layers of powder material 120. As the build piston 156 gradually lowers and sequential layers of powder material 120 are applied across the build plane 130, the next sequential layer of powder material 120 defines the surface of the powder bed 136 coinciding with the build plane 130. Sequential layers of the powder bed 136 may be selectively melted or fused until a completed object 114 has been additively manufactured.

In some embodiments, an additive manufacturing machine may utilize an overflow module 118 to capture excess powder material 120 in an overflow chamber 158. The overflow module 118 may include an overflow piston 160 that gradually lowers to make room within the overflow chamber 158 for additional excess powder material 120.

It will be appreciated that in some embodiments an additive manufacturing machine may not utilize a powder module 116 and/or an overflow module 118, and that other systems may be provided for handling powder material 120, including different powder supply systems and/or excess powder recapture systems. However, the subject matter of the present disclosure may be practiced with any suitable additive manufacturing machine without departing from the scope hereof.

Still referring to FIG. 1, in some embodiments, an additive manufacturing machine 102 may include a monitoring system 162. The monitoring system 162 may be configured to detect a monitoring beam (not shown) such as an infrared beam from a laser diode and/or a reflected portion of an energy beam, and to determine one or more parameters associated with irradiating the sequential layers of the powder bed 136 based at least in part on the detected monitoring beam. The one or more parameters determined by the monitoring system 162 may be utilized, for example, by the control system 104, to control one or more operations of the additive manufacturing machine 102 and/or of the additive manufacturing system 100. The monitoring system 162 may be configured to project a monitoring beam (not shown) and to detect a portion of the monitoring beam reflected from the build plane 130. Additionally, and/or in the alternative, the monitoring system 162 may be configured to detect a monitoring beam that includes radiation emitted from the build plane, such as radiation from an energy beam reflected from the powder bed 136 and/or radiation emitted from a melt pool in the powder bed 136 generated by an energy beam and/or radiation emitted from a portion of the powder bed 136 adjacent to the melt pool.

The monitoring system 162 may include componentry integrated as part of the additive manufacturing machine 102 and/or componentry that is provided separately from the additive manufacturing machine 102. For example, the monitoring system 162 may include componentry integrated as part of the energy beam system 134. Additionally, or in the alternative, the monitoring system 162 may include separate componentry, such as in the form of an assembly, that can be installed as part of the energy beam system 134 and/or as part of the additive manufacturing machine 102.

Figure 2:
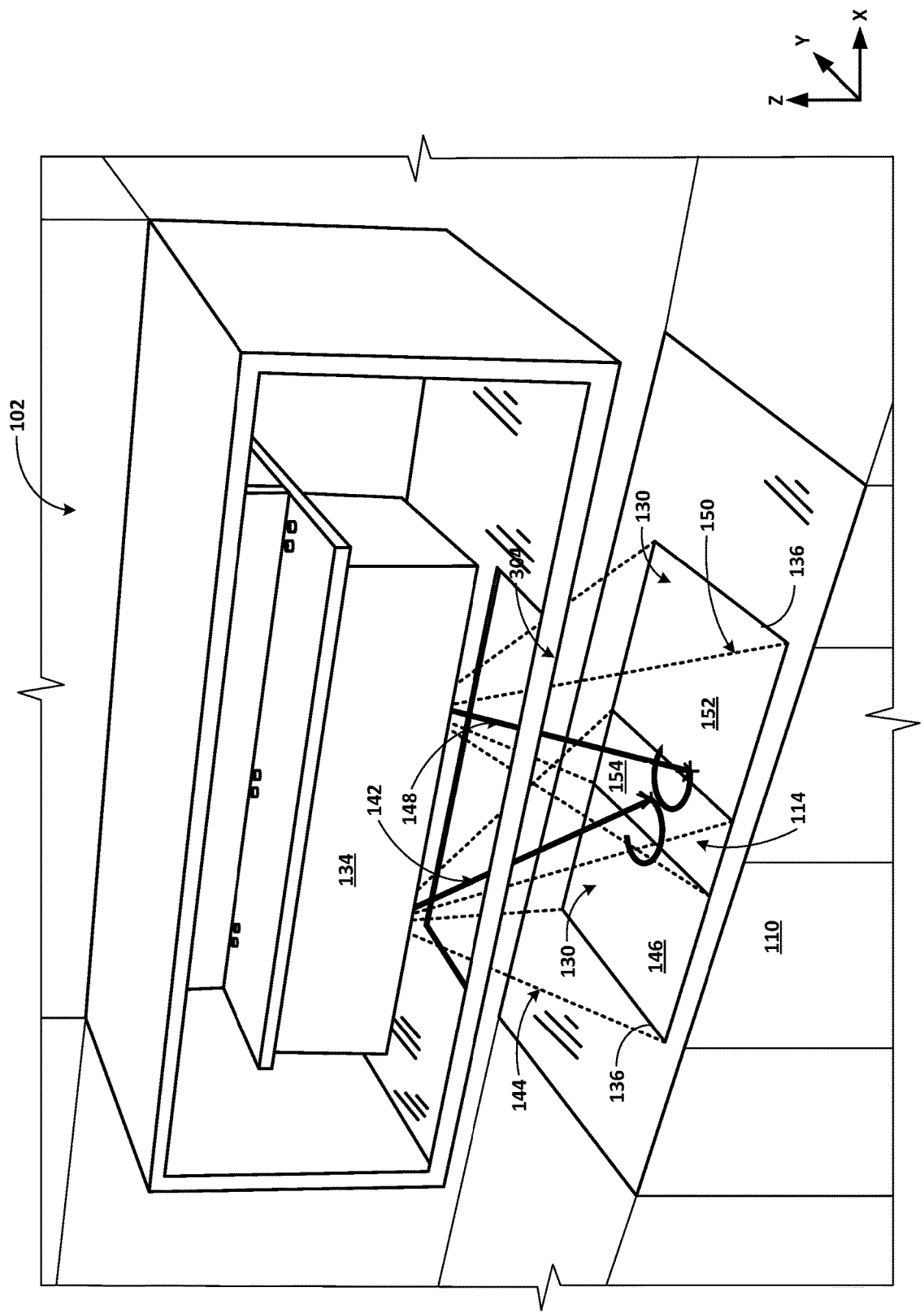
FIG. 2 schematically depicts a perspective view of an exemplary additive manufacturing machine.

Referring now to FIG. 2, a perspective view of the additive manufacturing machine 102 from FIG. 1 is shown. The first build plane region 146 represents a portion of the build plane 130 transecting the first scan field 144, and the second build plane region 152 represents a portion of the build plane 130 transecting the second scan field 150. The breadth of the first scan field 144 may be defined by a scannable range of the first energy beam 142. The breadth of the second scan field 150 may be defined by a scannable range of the second energy beam 148. Such a scannable range may be defined by operability limitations of the energy beam system 134 and/or quality limitations of objects 114 formed using the additive manufacturing machine 102. For example, energy beam system 134 may be capable of scanning an energy beam at a maximum angle of incidence. Additionally, or in the alternative, one or more object parameters of an object 114 may depend on the incidence angle of an energy beam and the resulting energy incident upon the build plane 130. In various embodiments, the breadth of the first scan field 144 and/or the second scan field 150 may be fixed or adjustable.

When additively manufacturing an object 114 with a plurality of energy beams (e.g., the first energy beam 142 and the second energy beam 148), respective portions of the object 114 may be formed using respective ones of the plurality of energy beams. In some embodiments, build parameters for the object 114 may define which portions of the object 114 are irradiated by the respective energy beams. An object 114 or a portion of an object 114 that extends into both the first build plane region 146 and the second build plane region 152 will be additively manufactured in part by the first energy beam 142 and in part by the second energy beam 148. An object 114 or a portion of an object 114 that extends into the interlace region 154 may be additively manufactured by the first energy beam 142, the second energy beam 148, or in part by the first energy beam 142 and in part by the second energy beam 148.

Figure 3:
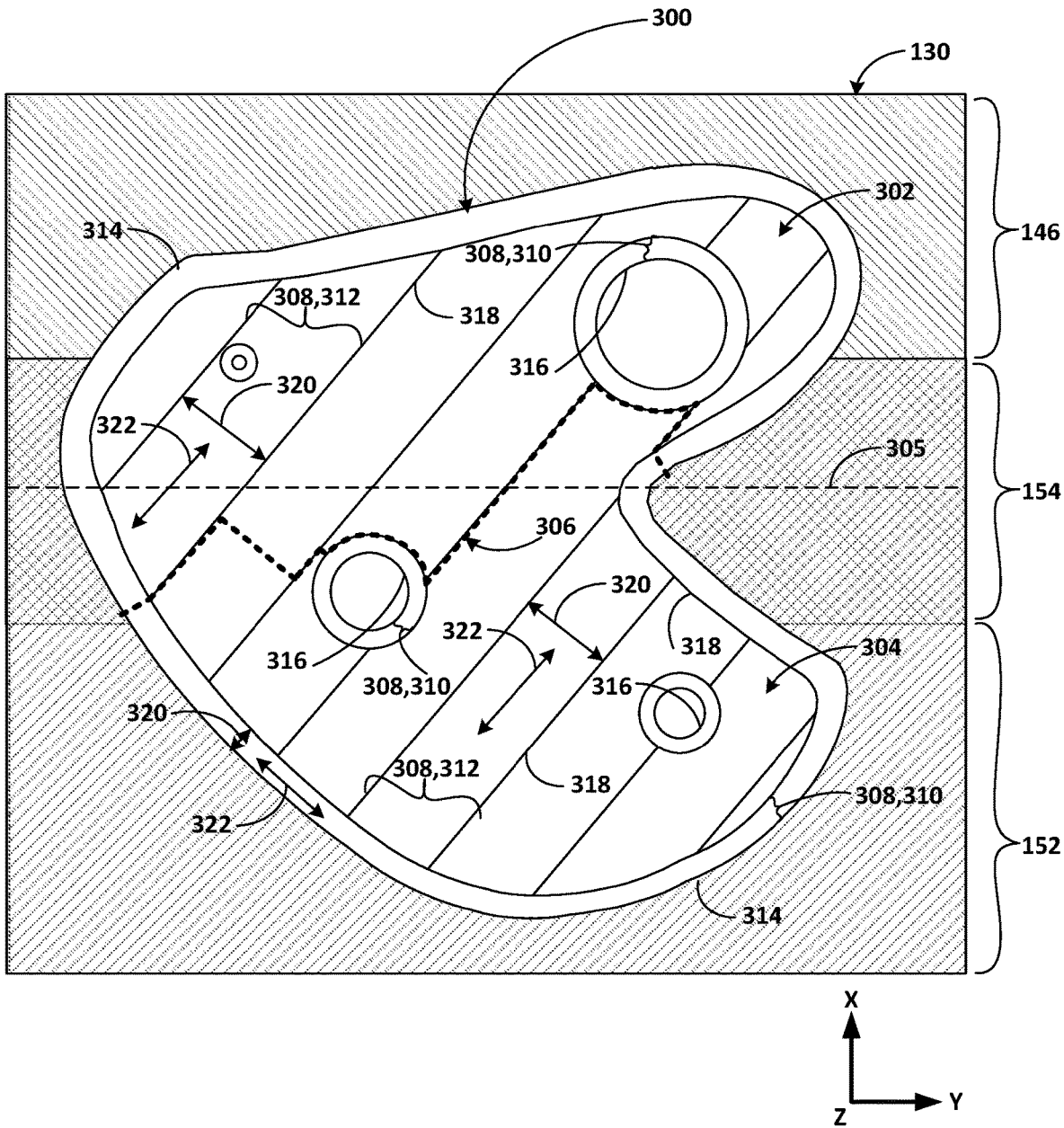
FIG. 3 schematically depicts an exemplary object slice illustrating a portion of a build plane that may be irradiated by a plurality of energy beams, with contour zones corresponding to the respective energy beams separated by an interlace path.

Referring now to FIG. 3, a top view of an exemplary object slice 300 is shown. The object slice 300 is oriented substantially parallel to the build plane 130. The object slice 300 may be embodied in a three-dimensional computer model of an object 114 to be additively manufactured, such as in a computer aided design (CAD) program. Additionally, or in the alternative, the object slice 300 may be embodied in a build file (e.g., a two-dimensional build file) executable by an additive manufacturing machine 102, such as an additive manufacturing file (AMF), a 3D manufacturing file (3MF), a standard tessellation language file (STL) or the like. The build file may include a series of contours, or slices, that respectively define the portions of a layer of powder material 120 to be selectively irradiated by the energy beam system 134.

The object slice 300 may be superimposed with the build plane 130. Respective portions of the object slice may be assigned to one or more of the plurality of irradiation devices, such as the first irradiation device 138 and/or the second irradiation device 140, of the energy beam system 134. As shown in FIG. 3, the object slice 300 includes a first contour zone 302 superimposed with the first build plane region 146, and a second contour zone 304 superimposed with the second build plane region 152. A portion of the first contour zone 302 and the second contour zone 304 are superimposed with the interlace region 154. The interlace region 154 may be divided by a midline 305. The midline 305 may be determined with reference to the build plane 130 and/or with reference to an object slice 300. For example, the midline may traverse the interlace region 154 at a position such that a first portion (e.g., 50%) of the interlace region 154 on a first side of the midline 305 is adjacent to the first build plane region 146, and a second portion (e.g., 50%) of the interlace region on a second side of the midline 305 is adjacent to the second build plane region 152. The first portion of the interlace region 154 and the second portion of the interlace region 154 may encompass a substantially symmetric proportion of the build plane 130 or a substantially asymmetric proportion of the build plane 130. Additionally, or in the alternative, the midline 305 may traverse the interlace region 154 at a position such that a first portion (e.g., 50%) of an object 114 on a first side of the midline 305 is adjacent to the first build plane region 146, and a second portion (e.g., 50%) of the object on a second side of the midline 305 is adjacent to the second build plane region 152. The first portion of the object 114 and the second portion of the object 114 may encompass a substantially symmetric proportion of the build plane 130 or a substantially asymmetric proportion of the build plane 130.

An interlace path 306 delineates the first contour zone 302 from the second contour zone 304. The first contour zone 302 may be assigned to the first irradiation device 138 and/or the first energy beam 142. The second contour zone 304 may be assigned to the second irradiation device 140 and/or the second energy beam 148. The interlace path 306 may delineate a contour boundary, such as an interlacing boundary, between the first energy beam 142 and a second energy beam 148. The first energy beam 142 and the second energy beam 148 may remain on their respective sides of at least a portion of the contour boundary. Additionally, or in the alternative, the first and second energy beams 142, 148 may follow respective contour paths that interlace with one another.

In some embodiments, the interlace path 306 may traverse at least a portion of the object slice 300 along a route that follows the midline 305. Additionally, or in the alternative, the interlace path 306 may traverse at least a portion of the object slice 300 along a route that departs from the midline 305.

The object slice 300 includes a plurality of contour zones 308. The contour zones 308 represent discrete regions of the object slice 300 that can be differentiated from one another. The energy beam system 134 may direct the one or more energy beams along a contour path that traverses respective ones of the contour zones 308 and/or the discrete regions of the object slice represented by the contour zones 308. By way of example, as shown in FIG. 3, an object slice 300 may include a plurality of boundary contour zones 310, and a plurality of interior contour zones 312. The plurality of boundary contour zones 310 may define a boundary of the object slice 300, such as an outer perimeter 314 of the object slice 300 and/or an interior perimeter 316 transecting the object slice 300. The interior contour zones 312 may represent an interior portion of the object slice 300. An interior contour zone 312 may be delimited by a contour border 318 and/or one or more boundary contour zones 310. As shown in FIG. 3, the interlace path 306 delineating the first contour zone 302 from the second contour zone 304 may traverse at least a portion of the object slice 300 along a route that coincides with one or more contour borders 318. Additionally, or in the alternative, the interlace path 306 may traverse at least a portion of the object slice 300 along a route that crosses one or more contour zones 308.

The contour zones 308 may be differentiated from one another in respect of one or more properties of the respective contour paths followed by respective ones of the one or more energy beams, in respect of one or more properties of the one or more energy beams, and/or in respect of one or more properties of the object 114 resulting from irradiation by the one or more energy beams. For example, the contour zones 308 may be differentiated from one another in respect of properties of the respective contour paths such as the timing, sequence, pattern, or combinations of these. Additionally, or in the alternative, the contour zones 308 may be differentiated from one another in respect of one or more irradiation parameters of the one or more energy beams such as scanning speed, scanning time, beam spot size, energy density, or combinations of these. Further in addition or in the alternative, the contour zones 308 may be differentiated from one another in respect of one or more object parameters of the object 114 resulting from irradiation by the one or more energy beams such as energy density, melt pool size, temperature, material density, consolidation pattern, crystalline structure, or combinations of these. By way of example, as shown in FIG. 3, the one or more energy beams may follow and/or define a contour path that traverses a contour zone 308 in a back-and-forth manner in a first direction 320, while advancing across a contour zone 308 in a second direction 322. The contour zones 308 may be arranged in a plurality of rows, as shown in FIG. 3, and/or in any other desired orientation.

Figure 4:
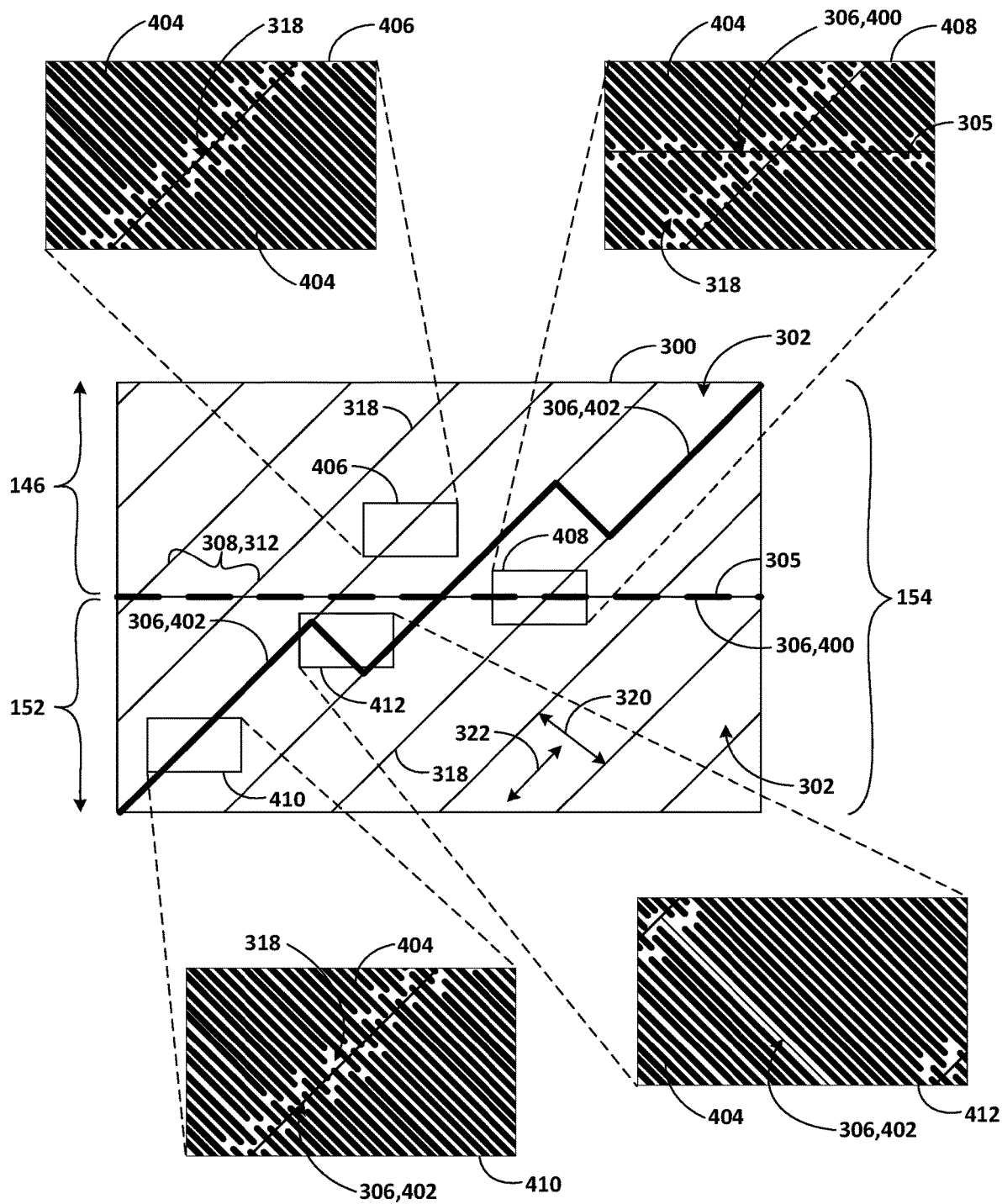
FIG. 4 schematically depicts another exemplary object slice, with enlarged views of exemplary contour zones and corresponding contour paths.

FIG. 4 shows a portion of an exemplary object slice 300, with two exemplary pathways for an interlace path 306. The object slice 300 shown in FIG. 4 includes a plurality of contour zones 308 (e.g., one or more interior contour zones 312) traversing an interlace region 154. Adjacent contour zones 308 may define respective contour borders 318. The plurality of contour zones 308 may have any desired shape, and may be configured and arranged about the object slice 300 with any desired manner. As shown, the plurality of contour zones 308 are configured and arranged as substantially linear strips distributed substantially uniformly across the object slice 300. The plurality of contours zones 308 traverse the interlace region 154 with an oblique orientation relative to the midline 305 of the interlace region 154. While the respective contour zones 308 shown in FIG. 4 appear substantially similar to one another, the contours zones 308 may additionally or alternatively be dissimilar to one another. For example, the contour zones 308 may have a uniform, random, or semirandom area. Additionally, or in the alternative, the contour zones 308 may have linear and/or curvilinear contour borders 318. The respective contour zones 308 include a plurality of contour paths 404. A first plurality of contour paths 404 corresponding to a first contour zone 302 may be adjacent to a second plurality of contour paths 404 corresponding to a second contour zone 308. The contour border 318 may be defined by adjacent portions of the first and second plurality of contour paths 404. As shown, for example, in a first enlarged view 406 of FIG. 4, a contour border 318 may be defined by adjacent portions of a first and second plurality of contour paths 404 irradiated by a first irradiation device 138 (FIG. 1) assigned to a first build plane region 146.

An interlace path 306 may traverse an interlace region 154 along a route that follows the midline 305, along a route that follows and/or defines one or more contour borders 318, and/or along a route that traverses one or more contour zones 308 between respective contour borders 318. As shown in FIG. 4, the first interlace path 306, 400 traverses at least a portion of the interlace region 154 along a route that follows the midline 305. Also as shown, a second interlace path 306, 402 traverses at least a portion of the interlace region 154 along a route that follows and/or defines one or more contour borders 318. The first interlace path 306, 400 the second interlace path 306, 402 may additionally or alternatively traverse one or more contour zones 308 (e.g., one or more interior contour zones 312). When traversing a contour zone 308, an interlace path 306 may follow a route that corresponds to the midline 305 and/or a route that diverges from the midline 305. An interlace path 306 may follow a rout that includes a linear trajectory, a curvilinear trajectory, a uniform trajectory, a random trajectory, and/or a semi-random trajectory.

As shown in FIG. 4, the first interlace path 306, 400 traverses a plurality of contour zones 308 along a route that follows the midline 305. As shown, for example, in a second enlarged view 408 of FIG. 4, an interlace path 306 (e.g., the first interlace path 400) may be defined by adjacent portion of a first plurality of contour paths 404 irradiated by a first irradiation device 138 (FIG. 1) and second plurality of contour paths 404 irradiated by a second irradiation device 140 (FIG. 1) assigned to a second build plane region 152. In some embodiments, the interlace path 306 (e.g., the first interlace path 400) may intersect a contour border 318. Also as shown in FIG. 4, the second interlace path 306, 402 traverses a plurality of contour zones 308 along a route that diverges from the midline 305. The second interlace path 306, 402 traverses a plurality of contour zones 308 along a route that includes a trajectory perpendicular to one or more contour borders 318. In some embodiments, an interlace path 306 may traverse a contour zone 308 along a route that follows and/or defines a contour path within the contour zone 308.

An interlace path 306 may traverse a plurality of contour zones 308 along a route that follows and/or defines a contour border 318. As shown, for example, in a third enlarged view 410 of FIG. 4, a contour border 318 may be defined by an interlace path 306 (e.g., the second interlace path 402) that includes a first plurality of contour paths 404 irradiated by a first irradiation device 138 (FIG. 1) and second plurality of contour paths 404 irradiated by a second irradiation device 140 (FIG. 1) assigned to a second build plane region 152. An interlace path 306 may additionally or alternatively traverse a plurality of contour zones 308 along a route that follows and/or defines a contour border 318. As shown, for example, in a fourth enlarged view 412 of FIG. 4, a contour path 404 may be defined by an interlace path 306 (e.g., the second interlace path 402) that includes a first plurality of contour paths 404 irradiated by a first irradiation device 138 (FIG. 1) and second plurality of contour paths 404 irradiated by a second irradiation device 140 (FIG. 1) assigned to a second build plane region 152.

Tradeoffs may exist between routing alternatives for an interlace path 306. For example, an interlace path 306 that passes through a contour zone 308 may influence one or more object parameters of the object 114 resulting from irradiation by the one or more energy beams such as energy density, melt pool size, temperature, material density, consolidation pattern, crystalline structure, or combinations of these. As another example, a location for an interlace path 306 may influence one or more irradiation parameters such as scanning speed, scanning time, beam spot size, energy density, or combinations of these. Additionally, or in the alternative, a location of an interlace path 306 may influence one or more production parameters, such as irradiation time, processing time, allocation of irradiation time and/or processing time between respective irradiation devise of an energy beam system 134.

An interlace path 306 that traverses the interlace region 154 along a route that follows the midline 305, such as the first interlace path 400, may represent a lowest value across the interlace region 154. A lowest value across the interlace region 154, such as along the midline 305, may minimize the proportion of the interlace region 154 occupied by an interlace path 306, which may minimize and/or balance an effect of the interlace path 306 on one or more object parameters, one or more irradiation parameters, and/or one or more production parameters. An interlace path 306 that follows the midline 305 may correspond to a substantially symmetric allocation and/or a substantially asymmetric allocation of an object slice 300 between respective irradiation devices of an energy beam system 134. For example, the proportion of an object slice 300 on a first side of the midline 305 (e.g., the proportion of the object slice 300 corresponding to the first build plane region 146 may differ from the proportion of the object slice 300 on the second side of the midline 305 (e.g., the proportion of the object slice 300 corresponding to the second build plane region 152. Such a difference in the proportion of the object slice 300 allocated between the respective irradiation devices may influence one or more production parameters. For example, a difference in the proportion of the object slice 300 allocated between respective irradiation devices may introducing differences in an allocation of irradiation time and/or processing time between respective irradiation devise of an energy beam system 134. Such differences in irradiation time and/or processing time may influence one or more irradiation parameters such as scanning speed, scanning time, beam spot size, energy density, or combinations of these. Such differences in irradiation time and/or processing time may additionally or alternatively influence one or more object parameters of the object 114 resulting from irradiation by the one or more energy beams such as energy density, melt pool size, temperature, material density, consolidation pattern, crystalline structure, or combinations of these.

As another example, an interlace path 306 that traverses the interlace region 154 along a route that follows and/or defines a contour border 318, such as the second interlace path 402, may avoid or prevent an influence by the interlace path 306 upon one or more irradiation parameters and/or object parameters within the contour zones 308 adjacent to the contour border 318. In some embodiments, an interlace path 306 that follows and/or defines a contour border 318 may correspond to a substantially symmetric allocation and/or a substantially asymmetric allocation of an object slice 300 between respective irradiation devices of an energy beam system 134. An asymmetric allocation between respective irradiation devices may influence one or more production parameters and/or one or more irradiation parameters such as scanning speed, scanning time, beam spot size, energy density, or combinations of these. Such an influence on production parameters and/or irradiation parameters may additionally or alternatively influence one or more object parameters of the object 114 resulting from irradiation by the one or more energy beams such as energy density, melt pool size, temperature, material density, consolidation pattern, crystalline structure, or combinations of these.

As yet another example, an interlace path 306 that traverses a contour zone 308 along a trajectory that is perpendicular to one or more contour zones 308 may represent a lowest value across a contour zone 308. A lowest value across a contour zone 308 may minimize the proportion of the contour zone 308 occupied by an interlace path 306, which may minimize and/or balance an effect of the interlace path 306 on one or more object parameters, one or more irradiation parameters, and/or one or more production parameters. Additionally, or in the alternative, an interlace path 306 may traverse a contour zone 308 along a route that follows and/or defines a contour path within the contour zone 308. An interlace path 306 that follows and/or defines a contour path within the contour zone 308 may avoid or prevent an influence by the interlace path 306 upon one or more irradiation parameters and/or object parameters within the contour zones 308.

In some embodiments, it may be advantageous for the interlace path 306 to follow and/or define a contour border 318, for example, because the contour border 318 would have already existed in the object slice 300 and, as such, an influence of the interlace path 306 upon the respective portions of the contour zones 308 may be minimized or avoided. Additionally, or in the alternative, it may be advantageous for the interlace path 306 to follow and/or define a contour path within a contour zone 308, for example, because the contour path would have already existed in the contour zone 308 and, as such, an influence of the interlace path 306 upon the respective portion of the contour zones 308 may be minimized or avoided. In some embodiments, it may be additionally or alternatively advantageous for an interlace path 306 to follow a path across an object slice 300 that provides for a substantially symmetric allocation of the object slice 300 between respective irradiation devices of an energy beam system 134, for example, because a substantially symmetric allocation between the respective irradiation devices may minimize and/or avoid differences in an allocation of irradiation time and/or processing time between respective irradiation devise, which may minimize and/or avoid an influence one or more irradiation parameters and/or one or more object parameters.

In some embodiments, as shown, for example, in the enlarged views 406, 408, 410, 412 of FIG. 4, the individual contour paths that define a contour border 318 and/or an interlace path 306 may have a regular and/or an irregular alignment and/or orientation. For example, a contour border 318 and/or an interlace path 306 may appear to have an irregular alignment and/or orientation when considered at relatively small scalar dimensions. At such small scalar dimensions, a contour border 318 and/or an interlace path 306 may appear to follow a jagged or interlocking path. Additionally, or in the alternative, the contour border 318 and/or the interlace path 306 may appear to have a regular alignment and/or orientation when considered at relatively large scalar dimensions. At such large scalar dimensions, a contour border 318 and/or an interlace path 306 may appear to follow a relatively uniform linear or curvilinear path. A contour border 318 and/or an interlace path 306 may be described with reference to scalar dimensions as appropriate for the context. For example, for purposes of control commands for an irradiation device, contour paths of an irradiation device are generally described with relatively small scalar dimensions corresponding to the precision level of the irradiation device. Additionally, or in the alternative, general characteristics of contour zones 308, contour borders 318, and/or interlace paths 306 may be described with relatively large scalar dimensions, such as when describing shapes or patterns of contour zones 308, and/or respective portions of an object slice 300 corresponding to respective build plane regions.

Figure 5A:
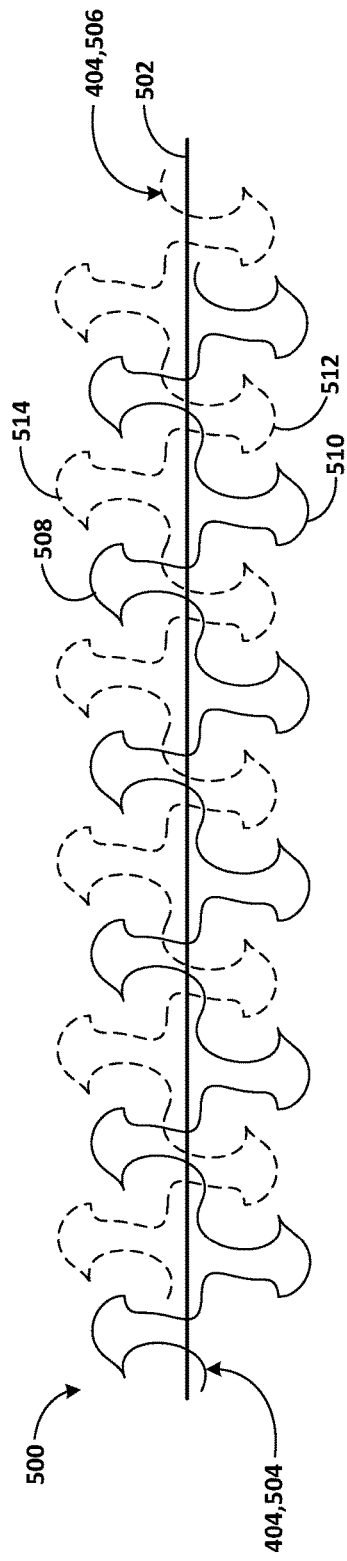
FIG. 5A schematically depicts another embodiment of exemplary contour paths.

The respective contour paths 404 shown in FIG. 4 are depicted as straight lines. In some embodiments, the contour paths 404 may follow a linear or curvilinear path, which may include a substantially straight line. Additionally, or in the alternative, in some embodiments, a contour path 404 may follow a more complex pathway. As shown in FIG. 5A, a contour path 404 may include a complex pattern 500 that follows a trajectory 502. By way of example, the complex pattern 500 may include facets with uniform and/or irregular features. In some embodiment, adjacent contour paths 404 may include overlapping features, such as overlapping facets. For example, a first contour path 504 and a second contour path 506 may overlap one another. The first contour path 504 may include first facets 508 that overlap with the second contour path 506, and/or the first contour path 504 may include second facets 510 that extend away from the second contour path 506. The second contour path 506 may include third facets 512 that overlap with the first contour path 504, and/or the second contour path 506 may include fourth facets 514 that extend away from the first contour path 504.

Figure 5B:
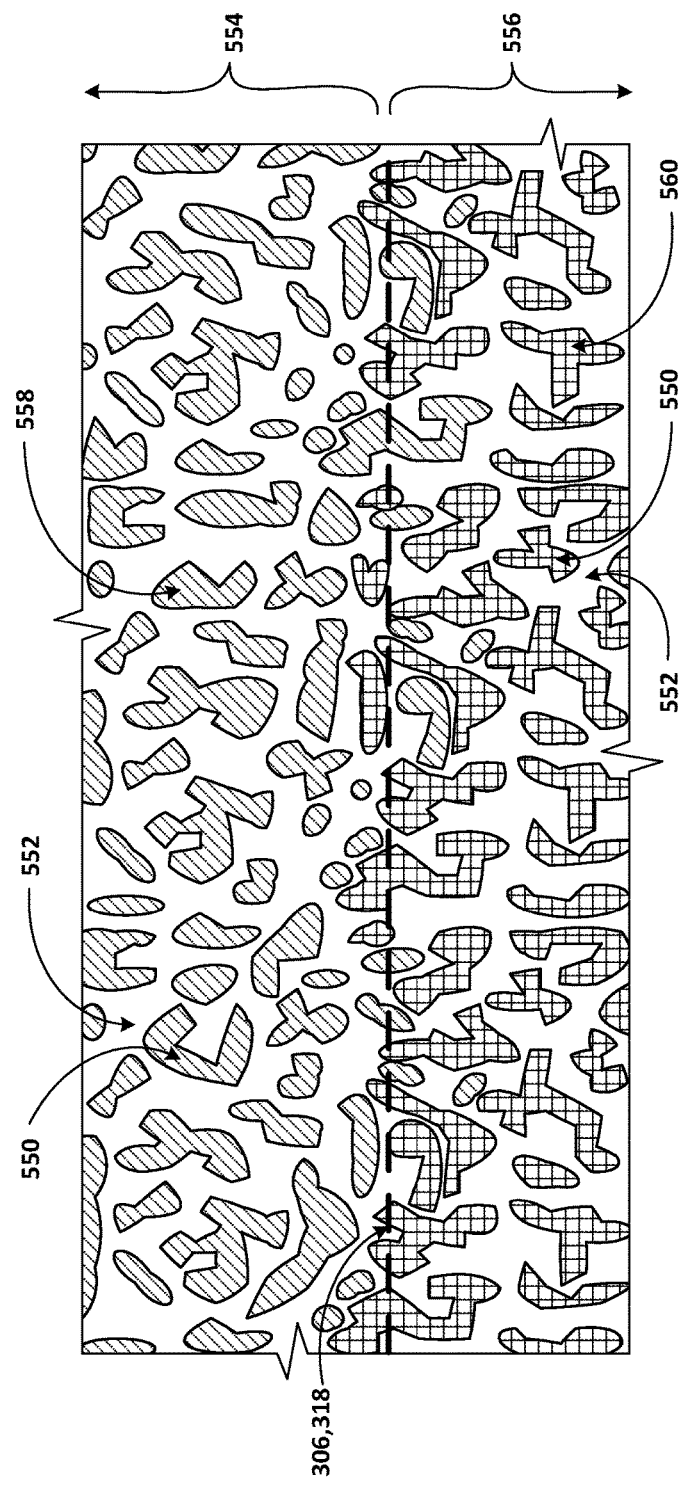
FIG. 5B schematically depicts exemplary irradiation zones within a contour zone.

In some embodiments, as shown, for example, in FIG. 4, respective contour zones 308 may be uniformly filled with contour paths 404 that follow a substantially continuous route. Additionally, or in the alternative, as shown in FIG. 5B, a contour zone 308 may include a combination of irradiation zones 550 that are designated to receive direct irradiation from an energy beam, and adjacent zones 552 that are designated to receive indirect radiation. A first contour zone 554 and a second contour zone 556 may define an interlace path 306 and/or a contour border 318. The first contour zone 554 may include a plurality of first irradiation zones 558. The plurality of first irradiation zones 558 may be designated to receive direct irradiation from a first energy beam 142 (FIG. 2). The second contour zone 556 may include a plurality of second irradiation zones 560. When the first contour zone 554 and a second contour zone 556 define an interlace path 306, the plurality of second irradiation zones 560 may be designated to receive direct irradiation from a second energy beam 148 (FIG. 2). When the first contour zone 554 and a second contour zone 556 define a contour border 318, the plurality of second irradiation zones 560 may be designated to receive direct irradiation from the energy beam 142 (FIG. 2).

In accordance with the present disclosure, an additive manufacturing system 100 may include a control system 104 configured to define an interlace path 306 across an interlace region 154 of an object slice 300, and/or to determine one or more contour zones 308 for an object slice 300. An interlace path 306 and/or corresponding contour zones 308 may be determined using a route-finding algorithm. Generally, a route-finding algorithm may be is configured to find a route across a zone from a source to a destination. The zone may be characterized as an array of vertices, and the route-finding algorithm may be considered to search the vertices to find a route that satisfies predefined search criteria. For example, a route-finding algorithm may be configured to determine a lowest value search using weighting values assigned to edges that connect adjacent vertices. By way of example, a route-finding algorithm may include and/or be based at least in part on a best-first algorithm (e.g., an A* algorithm), a depth-first algorithm, a breadth-first algorithm, a uniform value algorithm, a greedy algorithm, or combinations of these.

An exemplary best-first algorithm may include and/or be based at least in part on Dykstra's algorithm and/or an A* algorithm. An A* algorithm may be configured to select vertices from a search fringe in order of lowest estimated total value for expanding the fringe, where the total value is the sum of values from a source vertex to a destination vertex. An exemplary A* algorithm may include an error-admissible algorithm (e.g., a weighted A* algorithm), an iterative deepening algorithm, a simplified memory bounded algorithm, and so forth. An interlace path 306 may be determined for one or more object slices 300, such as all or a portion of the object slices 300 corresponding to an object 114. At least a portion of a respective object slice 300 may be divided into a plurality of vertices. For example, an interlace region 154 of an object slice 300 may be divided into a plurality of vertices. Weights may be assigned to constituent edges of the respective vertices according to one or more parameters. An interlace path 306 transecting the interlace region 154 may be determined for the object slice 300.

An exemplary depth-first algorithm may be configured to select vertices from a search fringe in order of deepest vertices (e.g., the furthest vertex from the source vertex). An exemplary breadth-first algorithm may be configured to select vertices from a search fringe in order of shallowest vertices (e.g., the closest vertex from the source vertex). An exemplary greedy algorithm may be configured to select vertices from a search fringe in an order of lowest heuristic value for expansion, which may correspond to the vertex estimated to be nearest to a destination vertex. An exemplary uniform value algorithm may be configured to select a lowest value vertices for expansion.

Figure 6A:
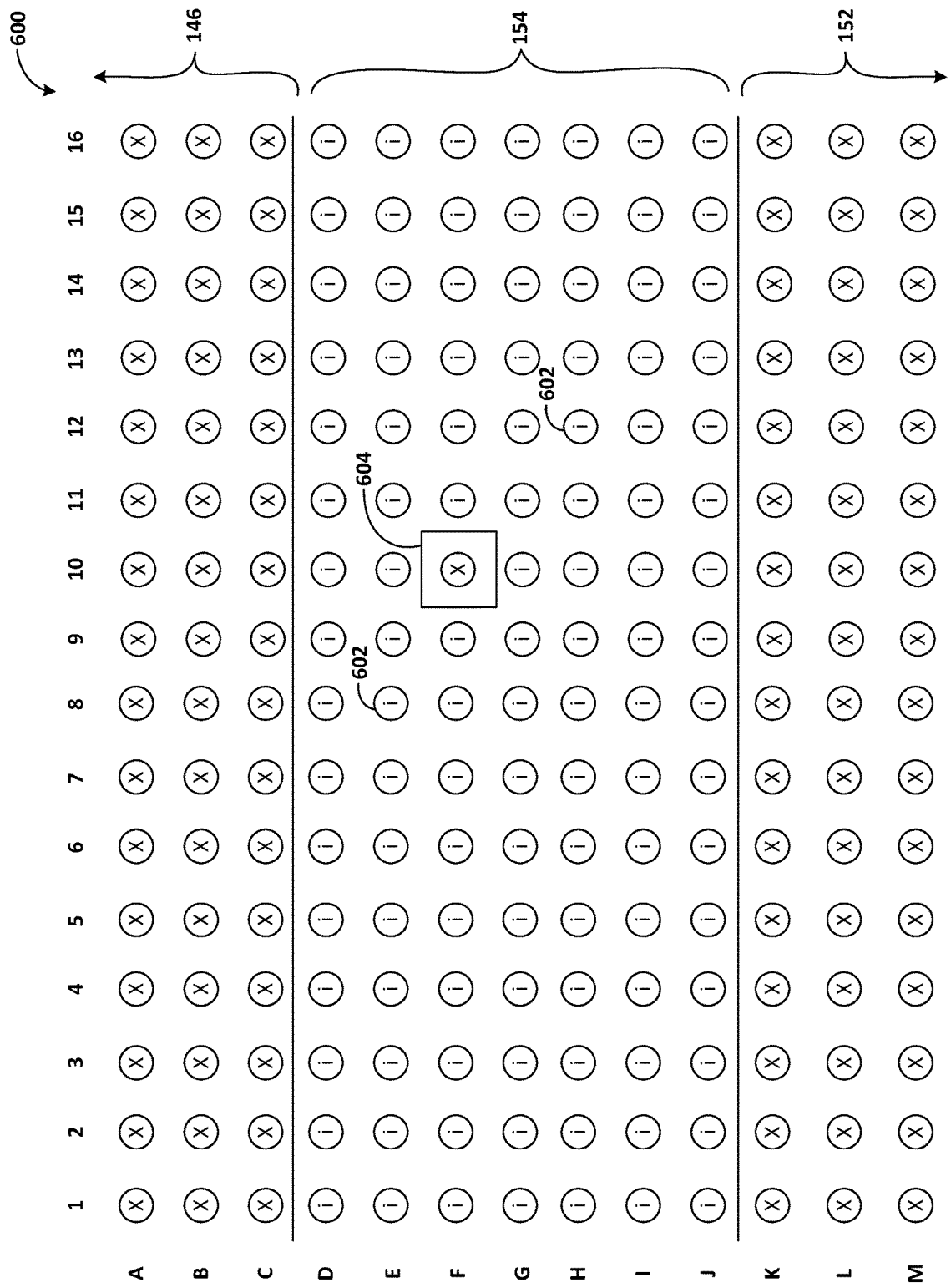
FIGS. 6A-6C schematically depict exemplary arrays of vertices corresponding to an object slice.
Figure 6B:
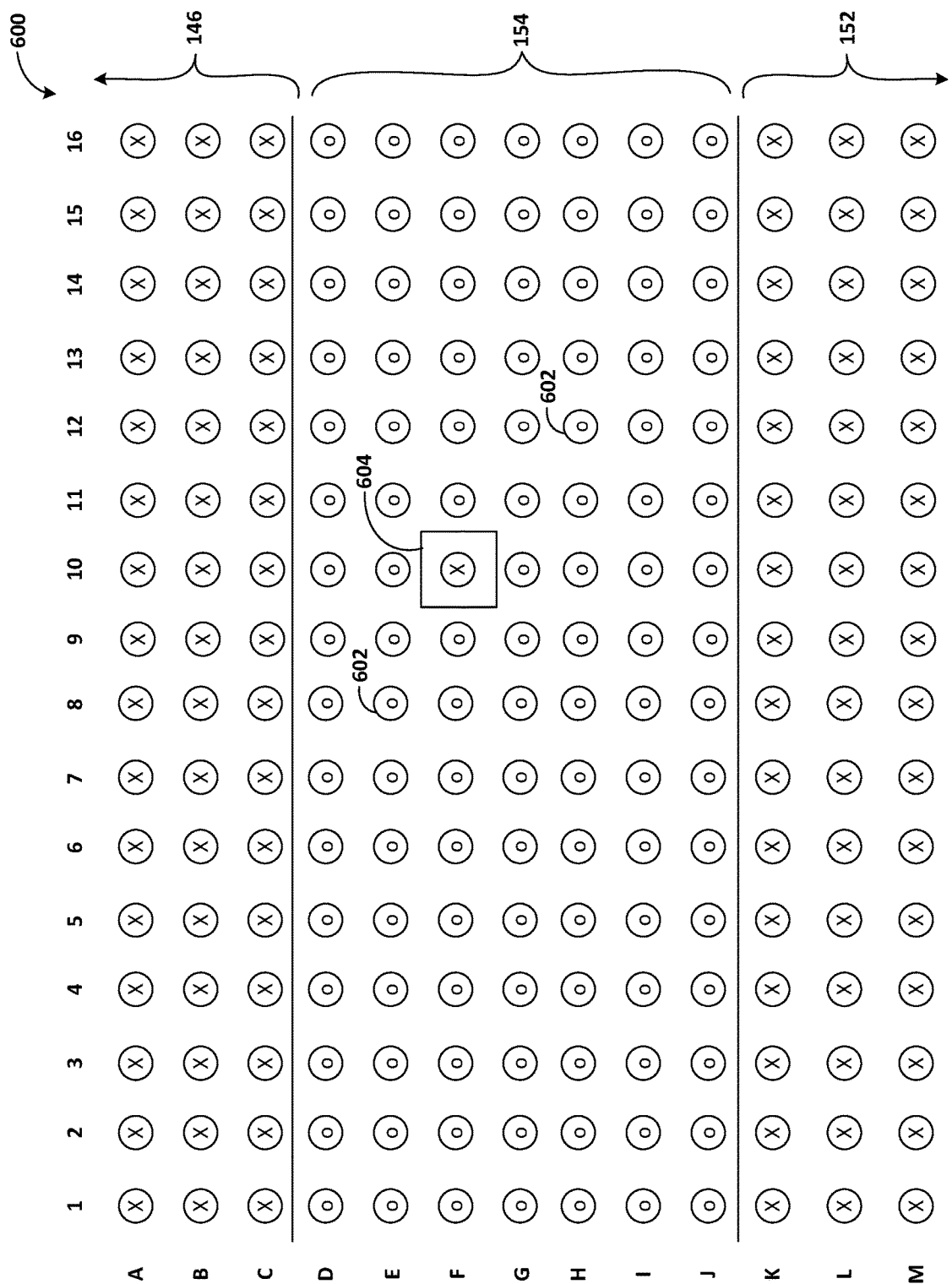

In some embodiments, one or more arrays of vertices may be determined. For example, FIGS. 6A-6C respectively depict an array 600 of vertices 602 corresponding to an object slice 300. The array 600 may include vertices 602 for at least a portion of the interlace region 154. The vertices 602 in the respective arrays 600 may be assigned weighting values corresponding to constituent edges of the vertices 602, and the weighting values may be utilized to define an interlace path 306 across the interlace region 154. FIG. 6A shows an array 600 of vertices 602 designated by an indicator "i" representing a weighting value of a constituent edge corresponding to one or more irradiation parameters. FIG. 6B shows an array 600 of vertices 602 designated by an indicator "o" representing a weighting value of a constituent edge corresponding to one or more object parameters. FIG. 6A shows an array 600 of vertices 602 designated by an indicator "p" representing a weighting value of a constituent edge corresponding to one or more production parameters. Weighting values for any one or more of the vertices 602 may be used to determine the interlace path 306. In some embodiments, vertices 602 designated by an indicator "X" may be ignored or excluded from the route-finding algorithm. For example, these vertices 602 may correspond to portions of the object slice 300 outside of the interlace region 154, such as portions of the object slice 300 corresponding to the first build plane region 146 and/or the second build plane region 152. Additionally, or in the alternative, the vertices 602 designated by an indicator "X" may correspond to a portion of the build plane 130 located outside of the object slice 300, such as portion of the build plane 130 intended to define a pathway 604 through the object 114. Additionally, or in the alternative, vertices 602 that that correspond to portions of the object slice 300 outside of the interlace region 154 may be included in the route-finding algorithm. In some embodiments, the object slice 300 may be repositioned relative to the build plane 130 when the route-finding algorithm determines an interlace path 306 that includes one or more of such vertices 602 initially corresponding to portions of the object slice 300 outside of the interlace region 154.

The vertices 602 in the array 600 may correspond to vertices 602 in a build file used to define the object 114, such as an object slice 300. All or a portion of the vertices 602 may be utilized to define an interlace path 306. For example, a selection of vertices 602 may be utilized. Vertices 602 selected for inclusion in the array 600 may correspond to one or more parameters of an object 114 or one or more object slices 300 defined by a build file, such as one or more geometric parameters of the object 114 and/or object slice 300. Exemplary geometric parameters may include edges, corners, interior regions, and so forth. Additionally, or in the alternative, vertices 602 selected for inclusion in the array 600 may correspond to one or more irradiation parameters defined by a build file, such as such as scanning speed, scanning time, beam spot size, energy density, or combinations of these. Vertices 602 selected for inclusion in the array 600 may additionally or alternatively correspond to one or more object parameters defined by a build file, such as one or more object parameters intended to be achieved by the one or more energy beams such as energy density, melt pool size, temperature, material density, consolidation pattern, crystalline structure, or combinations of these. In some embodiments, vertices 602 selected for inclusion in the array 600 may include a plurality of vertices 602 corresponding to points along one or more contour borders 318.

In some embodiments, vertices 602 may be selected for inclusion in the array 600 based at least in part on one or more parameters corresponding an object 114 that was previously additively manufactured, such as parameters corresponding to a previous iteration of the object 114 presently to be, or currently being, additively manufactured. Additionally, or in the alternative, vertices 602 may be selected for inclusion in the array 600 based at least in part on one or more parameters corresponding to one or more previously irradiated object slices 300 of an object 114 being additively manufactured. Vertices 602 may be selected for inclusion in the array 600, additionally or alternatively, based at least in part on one or more parameters corresponding to one or more object slices 300 of a previous iteration of the object 114. The one or more parameters used to select vertices 602 for inclusion in the array 600 may include the geometric parameters of the object 114 or one or more object slices 300, the one or more irradiation parameters, the one or more object parameters, and/or the one or more productivity parameters. The one or more parameters may include parameters defined by the build file and/or parameters determined by a monitoring system 162 (FIG. 1).

Weighting values may be assigned to respective edges connecting the vertices 602 selected from the build file. All or a portion of the edges may be assigned weighting values. The weighting values may be assigned based at least in part on an influence on the one or more parameters corresponding to the vertices 602 in the event that the interlace path 306 does or does not pass through the respective vertices 602. In some embodiments, a relatively high weighting value may correspond to an undesirable influence on a respective parameter. Additionally, or in the alternative, a relatively low weighting value may correspond to a desirable influence on a respective parameter. A relatively intermediate weighting value may correspond to a neutral influence on a respective parameter. The weighting values may be determined parameter information, such as information pertaining to one or more parameters of an object 114 or object slice 300 defined by a build file, such as one or more geometric parameters of the object 114 and/or object slice 300.

In some embodiments, weighting values may be determined based at least in part on one or more parameters corresponding an object 114 that was previously additively manufactured, such as parameters corresponding to a previous iteration of the object 114 presently to be, or currently being, additively manufactured. Additionally, or in the alternative, weighting values may be determined based at least in part on one or more parameters corresponding to one or more previously irradiated object slices 300 of an object 114 being additively manufactured. Weighting values may be determined, additionally or alternatively, based at least in part on one or more parameters corresponding to one or more object slices 300 of a previous iteration of the object 114. The one or more parameters used to determine weighting values may include the geometric parameters of the object 114 or one or more object slices 300, the one or more irradiation parameters, the one or more object parameters, and/or the one or more productivity parameters. The one or more parameters may include parameters defined by the build file and/or parameters determined by a monitoring system 162 (FIG. 1).

In some embodiments, the vertices 602 selected from the build file may be determined based at least in part on the weighting values assigned to respective edges. For example, vertices 602 may be selected from the build file when the weighting values satisfy one or more selection criteria. The one or more selection criteria may be determined such that the vertices 602 selected from the build file includes those most likely to influence the route-finding algorithm and/or such that the vertices 602 selected from the build file excludes those least likely to influence the route-finding algorithm.

Additionally, or in the alternative, the vertices 602 selected from the build file may be determined based at least in part on one or more contour paths 404 of one or more of the plurality of energy beams 142, 148. For example, vertices 602 may be selected based at least in part on a distance and/or time along a contour path 404, and/or a change in direction and/or a rate of change of a contour path 404. Additionally, or in the alternative, vertices 602 may be selected based at least in part on a distance or time along a contour path 404 (and/or a change in direction or a rate of change of a contour path 404) corresponding to an effectible change (or an effectible rate of change) to an object parameter as a result on a change in an irradiation parameter. For example, vertices 602 may be selected based at least in part on an effectible change (or an effectible rate of change) to energy density, melt pool size, temperature, material density, consolidation pattern, crystalline structure, or combinations of these. The effectible change (or an effectible rate of change) may depend at least in part on a change (or a rate of change) to one or more irradiation parameters such as scanning speed, scanning time, beam spot size, energy density, or combinations of these.

Figure 6C:
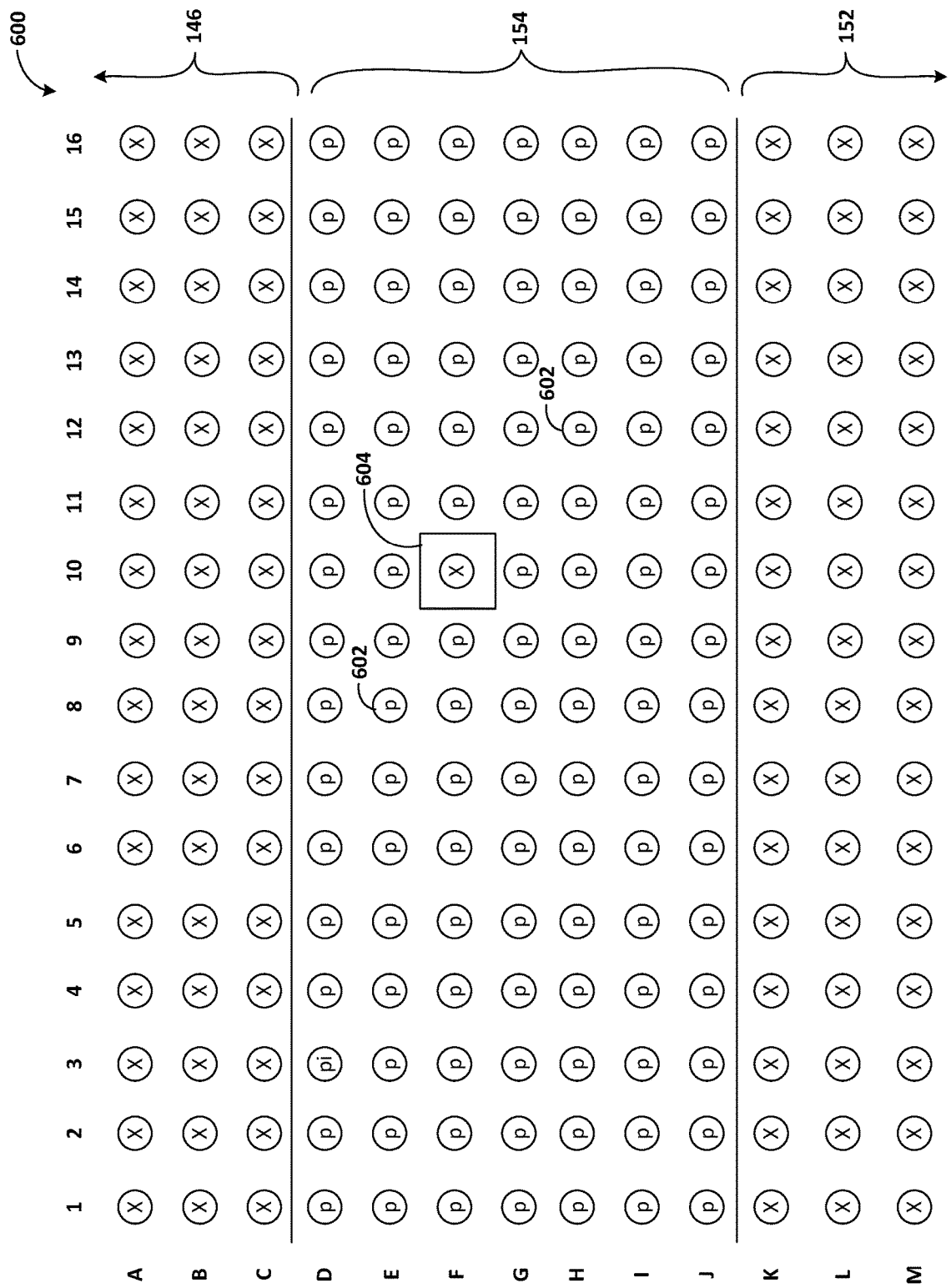
Figure 7A:
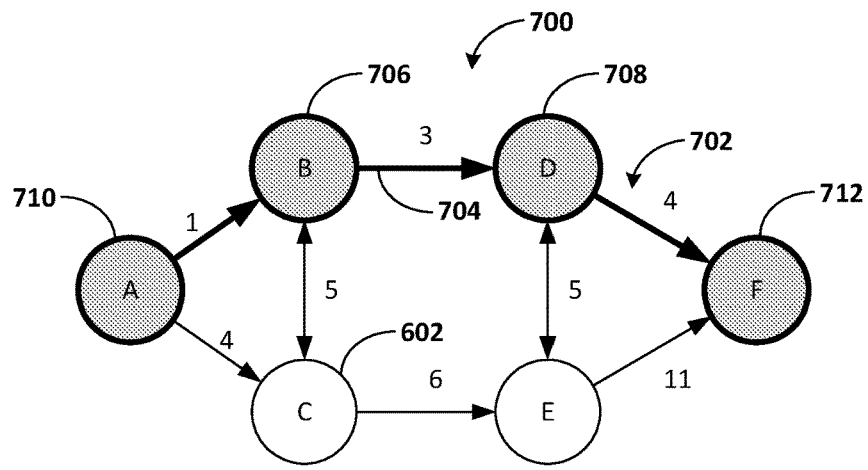
FIGS. 7A-7C schematically depict exemplary graphs depicting lowest value paths between vertices.
Figure 7B:
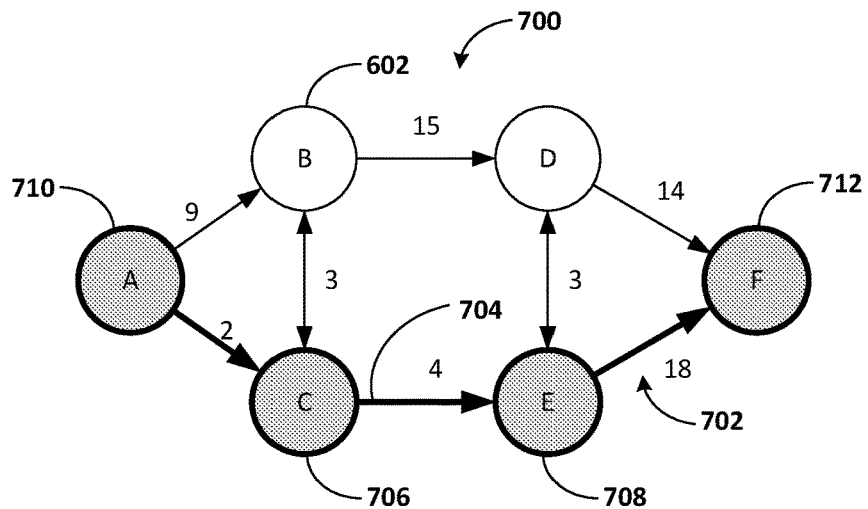
Figure 7C:
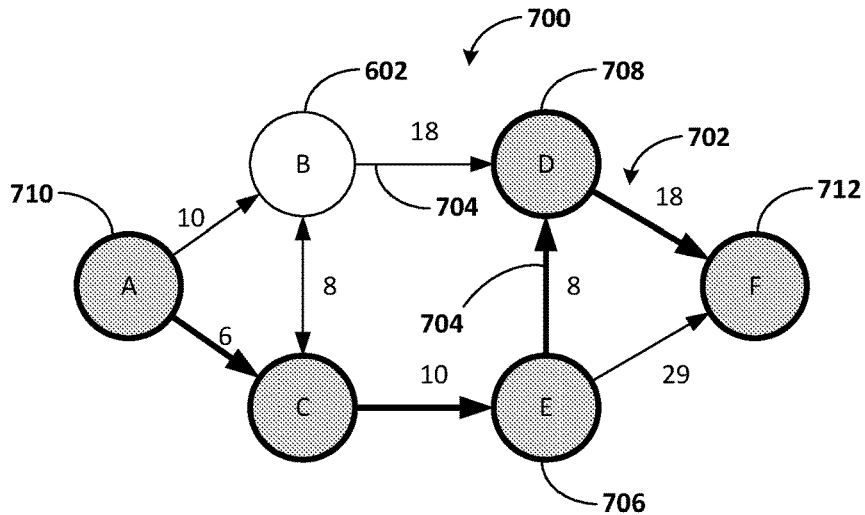

FIGS. 7A-7C show exemplary graphs 700 depicting a lowest value path 702 between vertices 602 based on the sum of weighting values of constituent edges. A lowest value path 702 may be utilized to define an interlace path 306 across an interlace region 154, for example, using an array 600 of vertices 602 such as those as shown in FIGS. 6A-6C. By way of illustration, FIG. 7A shows a graph 700 with weighting values based on a first criterion, FIG. 7B shows a graph 700 with weighting values based on a second criterion, and FIG. 7C shows a graph 700 with weighting values based on a third criterion. In some embodiments, the third criterion used for the weighting values in the graph 700 shown in FIG. 7C may include the weighting values based on the first criterion shown in FIG. 7A and the weighting values based on the second criterion shown in FIG. 7B. For example, the weighting values in the graph 700 shown in FIG. 7C may be a sum of the weighting values based on the first criterion and the weighting values based on the second criterion.

For the graph 700 shown in FIG. 7A, a lowest value path 702 from vertices "A" to vertices "F" passes through vertices "B" and vertices "D", with a sum of weighting values of 8 (e.g., 1+3+4=8). By contrast, a path from vertices "A" to vertices "F" that passes through vertices "C" and/or vertices "E" would provide a sum of weighting values of at least 16 (e.g., for vertices "C", 4+5+3+4=16; and for vertices "E", 4+6+5+4=19).

For the graph 700 shown in FIG. 7B, a lowest value path 702 from vertices "A" to vertices "F" passes through vertices "C" and vertices "D". The lowest value path 702 for the graph 700 shown in FIG. 7B differs from the lowest value path 702 for the graph 700 shown in FIG. 7C because of the difference in weighting values. As shown in FIG. 7B, the lowest value path 702 passing through vertices "C" and vertices "D" has a sum of weighting values of 22 (e.g., 2+4+18=22). By contrast, for the graph 700 shown in FIG. 7B, a path from vertices "A" to vertices "F" that passes through vertices "B" and/or vertices "D" would provide a sum of weighting values of at least 23 (e.g., for vertices "B", 2+3+15+14=35; and for vertices "D", 2+4+3+14=23).

For the graph 700 shown in FIG. 7C, a lowest value path 702 from vertices "A" to vertices "F" passes through vertices "C", vertices "E", and vertices "D". The weighting values for the graph 700 shown in FIG. 7C may be a sum of the weighting values for the graphs 700 shown in FIGS. 7A and 7B. As shown in FIG. 7C, the sum of weighting values for the lowest value path 702 has a sum of weighting values of 42 (e.g., 6+10+8+18=42). By contrast, the sum of weighting values for a path from vertices "A" to vertices "F" that passes through vertices "B" is at least 23 (e.g., 10+18+18=46).

As illustrated by the graphs 700 shown in FIGS. 7A, 7B, and 7C, the lowest value path 702 from a starting vertices 602 (e.g., vertices "A") to an ending vertices 602 (e.g., vertices "F") may differs as between the respective weighing values (e.g., as between the graph 700 shown in FIGS. 7A and 7B). Additionally, or in the alternative, the lowest value path 702 from a starting vertices 602 (e.g., vertices "A") to an ending vertices 602 (e.g., vertices "F") may differs as between a sum of the weighting values relative to the respective weighting values considered individually (e.g., as between the graph 700 shown in FIGS. 7C and 7A and/or FIGS. 7C and 7B).

A lowest value path 702 may be determined for a multitude of vertices 602 using a route-finding algorithm. An interlace path 306 may be based at least in part on a route-finding algorithm, and/or a lowest value path 702 determined using a route-finding algorithm. An exemplary interlace path ($I_p$) 306 may include a sequence of vertices ($v_i$) 602, such that $I_p$ which=($v_1, v_2, \ldots, v_n$) in $v_i$ is adjacent to $v_i+1$ for $1 \le i < n$, with the interlace path $I_p$ 306 being of length n−1 from $v_1$ to $v_n$. The sequence of vertices $v_i$ 602 that defines the interlace path $I_p$ 306 across the interlace region 154 includes edges $e_{i \to j}$ 704 incident to vertices $v_i$ 706 and $v_j$ 708.

In some embodiments, the control system 104 and/or a route-finding algorithm may be configured to determine one or more route parameters. The route parameters may be utilized to evaluate the performance of a route-finding algorithm, to identify opportunities for improved interlace paths 306 for objects 114 and/or object slices 300. For example, the control system 104 and/or a route-finding algorithm may determine and/or maintain an interlace path database that includes data pertaining to lowest value paths 702 determined by a route-finding algorithm and/or interlace paths 306 corresponding thereto. The data may be determined on a per object 114 and/or a per object slice 300 basis. The data may additionally or alternatively be determined with respect to one or more respective interlace regions 154. Statistical parameters may be determined to analyze and/or benchmark performance of the control system 104 and/or one or more route-finding algorithms.

By way of example, a benchmarking parameter may be determined, such as a percentage of surface area of an object 114 and/or of one or more object slices 300 irradiated per energy beam, and/or a difference in irradiation time as between respective energy beams. In some embodiments, the benchmarking parameters may include one or more irradiation parameters, one or more object parameters, and/or one or more production parameters. In some embodiments, a route-finding algorithm may be initiated for an object and/or one or more object slices 300 when a benchmarking parameter exceeds a threshold condition, such as when an actual or expected benchmarking value exceeds a threshold condition. For example, a route-finding algorithm may be initiated when a threshold is exceeded for an actual or expected percentage of surface area irradiated per energy beam, and/or for a difference in irradiation time as between respective energy beams.

Figure 8:
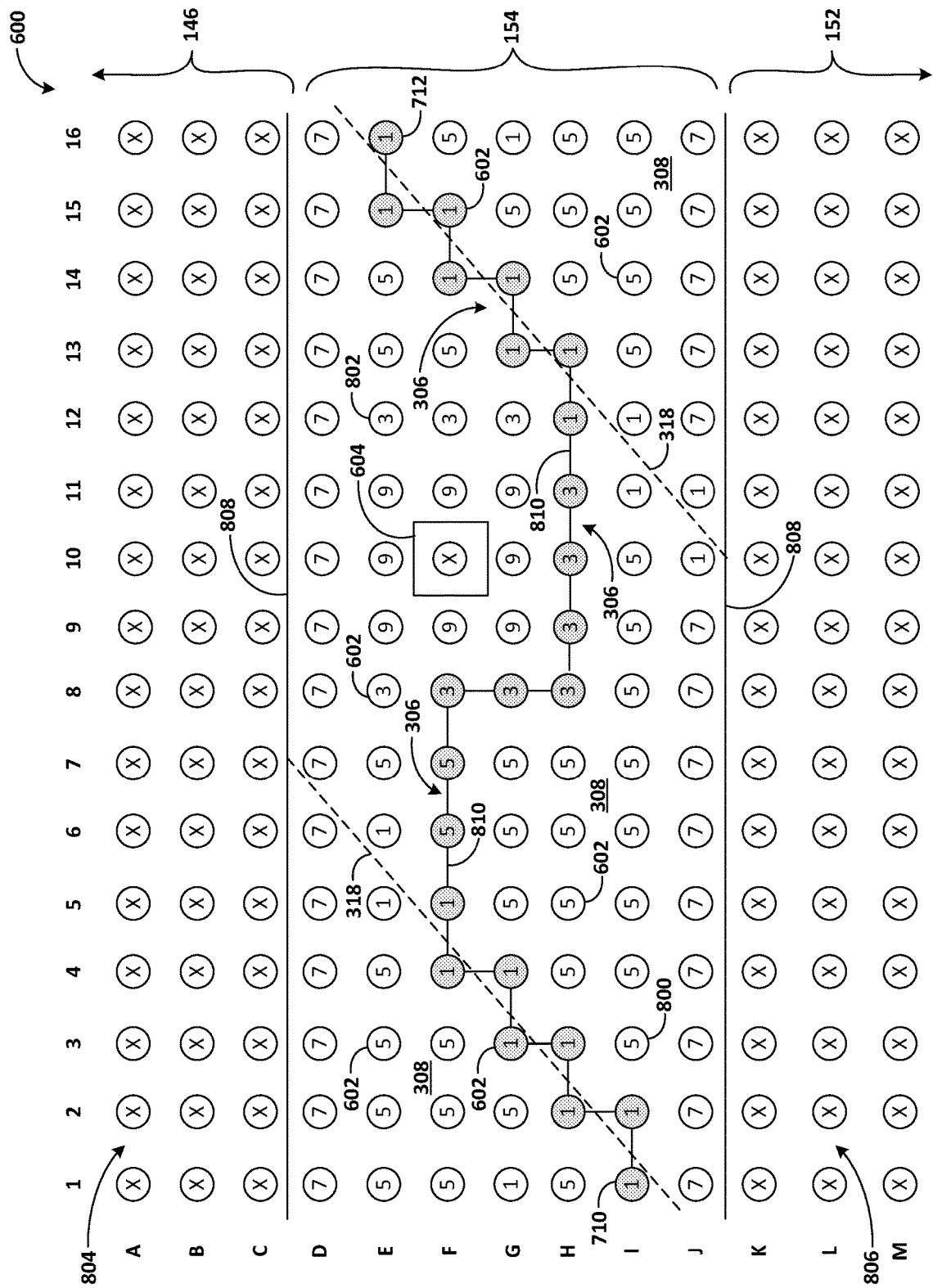
FIG. 8 schematically depicts an exemplary interlace path determined from an array of vertices using a route-finding algorithm.

Referring now to FIG. 8, an exemplary interlace path 306 determined from an array 600 of vertices 602 using a route-finding algorithm is shown. The array 600 of vertices 602 may correspond to an object slice 300. The array 600 of vertices 602 includes a plurality vertices 602 identifiable by their respective coordinates in the array 600. For example, a first vertex 800 may be located at coordinates (I,3) and a second vertex 802 may be located at coordinates (E,12). As shown, the interlace path 306 traverses an interlace region 154 of an object slice 300 from a source border 804 to a destination border 806.

The sequence of vertices ($v_1, v_2, \ldots, v_n$) 602 in the interlace path $I_p$ 306 may include a source vertex 710 and a destination vertex 712. The interlace path 306 may begin at the source vertex 710 and/or may end at the destination vertex 712. A possible interlace path 306 follows constituent edges $e_i$ 704 such that $I_p = (e_{v1 \to v2}, e_{v2 \to v3}, e_{vn-1 \to vn})$. The constituent edges $e_{i \to j}$ 704 may be weighted according to a function $w(p) = \Sigma_{1 \le i \le n} w(e_i)$. Over a set of k possible interlace paths 306, a selected interlace path 306 may provide a minimum sum of edge weights, such that $I_p = \min_{k \in S} w(p)$. When the respective edges 704 have an identical weighting (e.g., when the respective edges $e_{i \to j}$ 704 are weighted according to a function $w(e) \to \{1\}$), the interlace path 306 may be the path that has the fewest edges.

The source vertex 710 may have a defined or variable position. For example, the source vertex 710 may be located anywhere along a source border 804 of the interlace region 154. The destination vertex 712 may have a defined or variable position. For example, the destination vertex 712 may be located anywhere along a destination border 806 of the interlace region 154. In some embodiments, an interlace path 306 may be determined from a fixed source vertex 710 and a variable destination vertex 712. The interlace path 306 may follow the lowest weighted path from the fixed source vertex 710 on the source border 804 to a plurality of destination vertices 712 along the destination border 806. The destination vertex 712 that provides the lowest weighted path from the fixed source vertex 710 may be selected for the interlace path 306.

In some embodiments, an interlace path 306 may be determined from a variable source vertex 710 and a fixed destination vertex 712. The interlace path 306 may follow the lowest weighted path from a plurality of source vertices 710 on the source border 804 to the fixed destination vertex 712 along the destination border 806. The source vertex 710 that provides the lowest weighted path to the fixed destination vertex 712 may be selected for the interlace path 306.

In some embodiments, an interlace path 306 may be determined from a variable source vertex 710 and a variable destination vertex 712. The interlace path 306 may follow the lowest weighted path from a plurality of source vertices 710 on the source border 804 to a plurality of destination vertices 712 along the destination border 806. The source vertex 710 and the destination vertex 712 that provide the lowest weighted path may be selected for the interlace path 306.

As shown in FIG. 8, vertices 602 near a border 808 of the interlace region 154 may have relatively higher weighting values. Additionally, or in the alternative, vertices 602 within a middle region of a contour zone 308 may have relatively intermediate weighting values. Vertices 602 along a contour border 318 may additionally or alternatively have relatively lower weighting values. Further additionally or alternatively, vertices 602 near a boundary of the object slice 300, such as a boundary defining a pathway 604 through the object slice 300, have relatively higher weighting values, such as relatively higher weighing values as compared to a border 808 of the interlace region 154. By way of illustration, vertices 602 near a border 808 of the interlace region 154 are shown in FIG. 8 with weighting values of 7, vertices 602 within a middle region of a contour zone 308 are shown in FIG. 8 with weighting values of 5, vertices 602 along a contour border 318 are shown in FIG. 8 with weighting values of 1, and vertices 602 along a boundary defining a pathway 604 through the object slice 300 are shown in FIG. 8 with weighting values of 9. Vertices 602 along a contour border 318 as between the boundary defining the pathway 604 and the adjacent contour zone 308 have weighting values of 3.

Using the weighting values shown in FIG. 8, a lowest value path 810 traversing the interlace region 154 begins at a source vertex 710 located at coordinates (I,1) and ends at a destination vertex 712 located at coordinates (E,16). The lowest value path 810 may be selected as the interlace path 306. Beginning from the source vertex 710 at coordinates (I,1), the lowest value path 810 follows a contour border 318 to the vertex at coordinates (F,5), at which point the lowest value path 810 traverses a contour zone 308. At coordinates (F,8), the lowest value path 810 routes around relatively higher-weighted vertices 602 surrounding a pathway 604, following a contour border 318 from coordinates (F,8) to (H,8) and from (H,8) to (H,11). The lowest value path 810 intersects an additional contour border 318 at coordinates (H,12), which gives the lowest value path 810 to the destination vertex 712. It will be appreciated that the lowest value path 810 may reflect a balance between a plurality of criteria, such as one or more irradiation parameters, one or more object parameters, and/or one or more production parameters.

Any suitable route-finding algorithm may be used to define an interlace path 306. In some embodiments, an interlace path 306 may be determined based at least in part on a route-finding algorithm that utilizes one or more features of Dijkstra's algorithm, which provides data structure may be defined for storing and querying partial solutions sorted by distance from the source vertex 710.

Figure 9:
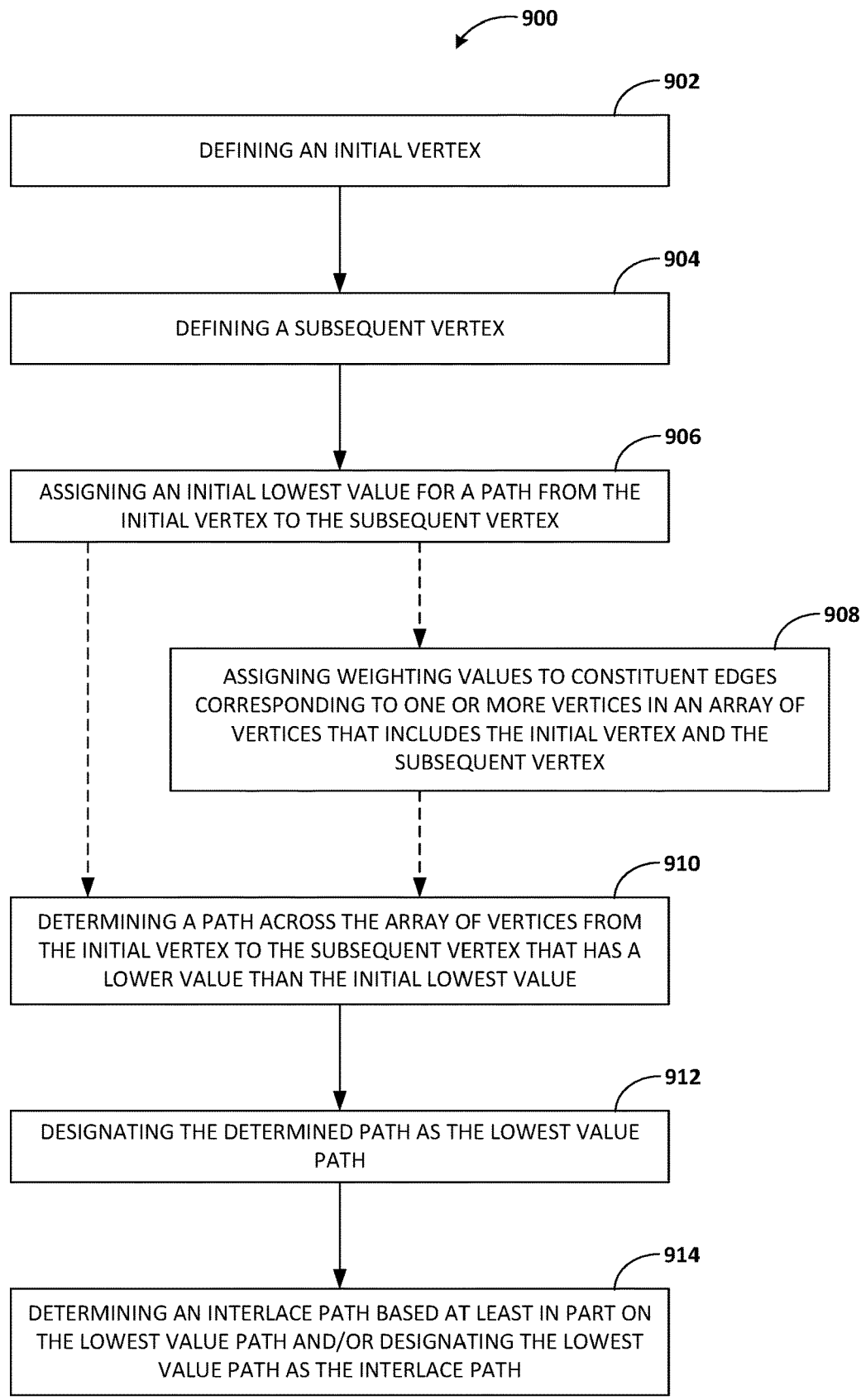
FIG. 9 shows a flowchart depicting an exemplary method of defining an interlace path.

FIG. 9 shows a flowchart depicting an exemplary method 900 of defining an interlace path 306. At block 902, an initial vertex $v_i$ 602 is defined. The initial vertex $v_i$ 602 may be located at an outer perimeter 314 of the object slice 300 (FIG. 3) somewhere within the interlace region 154. The initial vertex $v_i$ 602 may be a source vertex 710. At block 904, a subsequent vertex 602 is defined. The subsequent vertex 602 may be a destination vertex 712. At block 906, an initial lowest value may be assigned for a path from the initial vertex 602, such as the source vertex 710, to the subsequent vertex 602, such as the destination vertex 712. In some embodiments, at block 908, the route-finding algorithm may assign weighting values to constituent edges corresponding to one or more vertices 602 in an array 600 of vertices 602 ($v_1, v_2, \ldots, v_n$). Additionally, or in the alternative, weighting values may have previously been assigned. The array 600 of vertices 602 may include the initial vertex $v_i$ 602 and the subsequent vertex 602. At block 910, the route-finding algorithm may determine a path across the array 600 of vertices 602 from the initial vertex $v_i$ 602 to the subsequent vertex 602 that has a lower value than the initial lowest value. When the route-finding algorithm determines such a lower value, at block 912, the route-finding algorithm designates the determined path as the lowest value path 702, 810. At block 914, an interlace path 306 may be determined based at least in part on the lowest value path 702, 810. Additionally, or in the alternative, at block 914, the lowest value path 702, 810 may be designated as the interlace path 306. Additionally, or in the alternative, the route-finding algorithm may return to block 910, and again look for a path from the initial vertex to the subsequent vertex 602 that has a lower value than current lowest value path 702, 810. In some embodiments, the route-finding algorithm may return to block 902, and a different initial vertex 602 may be defined. Additionally, or in the alternative, the route-finding algorithm may return to block 904, and a different subsequent vertex 602 may be defined.

In some embodiments, all vertices 602 may be initially marked as unvisited. The route-finding algorithm may define an unvisited set of vertices 602 that includes the unvisited vertices 602. One or more of the unvisited vertices 602 may be assigned a tentative weighting value. The initial vertex $v_i$ 602 may be set to zero. The unvisited vertices 602 may be set to infinity. The initial vertex $v_i$ 602 may be set to the current vertex 602. For the current vertex 602, the route-finding algorithm may consider one or more unvisited vertices 602 neighboring the current vertex 602 and determine their tentative weighting values through the current vertex 602. The tentative weighting values may be compared to the current assigned value and assign the smaller one. For example, if the current vertex 602 is set to zero, and the edge connecting the current vertex 602 with a neighboring vertex 602 (e.g., vertex "C" in FIG. 7C) has a weighting value of 6, then the weighting value through vertex "B" 602 from the current vertex 602 will be 0+6=6. If vertex "B" was previously marked with a weighting value greater than 6, the weighing value for vertex "B" may be changed to 6. Otherwise, the current value for vertex "B" may be retained. For example, vertex "B" may be changed from an initial value of infinity to a value of 6. When at least some of the neighboring vertices 602 to the current vertex 602 have been checked (e.g., when all of the neighboring vertices 602 have been checked), the current vertex 602 may be marked as visited and removed from the unvisited set. Vertices 602 marked as visited may be labeled with the lowest value path 810 from the initial vertex. In some embodiments, it may be unnecessary to check a visited vertex 602 again after it has been checked and removed from the unvisited set. For example, a checked vertex may never be checked again. Once at least some (e.g., all) of the neighboring vertices 602 to the current vertex 602 have been checked, an unvisited vertex 602 with the smallest tentative distance may be set as the new current vertex 602, and neighboring vertices 602 to the new current vertex 602 may be checked.

The route-finding algorithm may continue updating neighboring vertices 602 with respective lowest values, marking then-current vertices 602 as visited, and moving onto a next unvisited vertices 602 until the destination vertex 712 has been marked as visited. The route-finding algorithm may conclude when the destination vertex 712 has been marked visited. For example, the destination vertex 712 may eventually be marked visited and the route-finding algorithm thereafter concluded when determining a route between two specific vertices 602, such as a source vertex 710 and a destination vertex 712. Once the destination vertex 712 has been marked as visited, the lowest value path 810 to from the initial vertex $v_i$ 602 to the destination vertex 712 is determined or determinable. For example, the lowest value path 810 may be traced from the destination vertex 712 back to the initial vertex $v_i$ 602. Additionally, or in the alternative, the route-finding algorithm may be concluded when the smallest tentative distance among vertices 602 remaining in the unvisited set is infinity. For example, the smallest tentative distance among vertices 602 remaining in the unvisited set may be infinity when determining a complete traversal of an array 600 and/or when there is no connection between the initial vertex 602 and remaining unvisited vertices 602. In some embodiments, a lowest value path 810 may be determined prior to the destination vertex 712 having been visited. For example, the route-finding algorithm may be concluded when the destination vertex 712 has the smallest tentative distance among all unvisited vertices 602, since the destination vertex 712 could then be selected as the next current vertex 602.

In some embodiments, the route-finding algorithm makes no attempt of directional exploration towards the destination vertex 712, but rather, the next current vertex 602 may be determined solely or at least in part based on the weighted value (or tentative weighted value) from the source vertex 710. This route-finding algorithm may therefore expand outward from the source vertex 710, considering every vertex 602 that provides a lower value path until reaching the destination vertex 712. As such, the route-finding algorithm may be configured to necessarily find the lowest value path 810. However, in some embodiments, the processing time required to find the true lowest value path 810 may be impractical. Accordingly, in some embodiments, the route-finding algorithm may include one or more features that may provide a reduced processing time.

In some embodiments, a library of visited vertices 602 may be maintained. The route-finding algorithm may utilize the library of visited vertices 602 in lieu of reprocessing the visited vertices 602 when additively manufacturing an object 114. The library of visited vertices 602 may be updated as one or more vertices are visited. When additively manufacturing an object 114 in a first instance, a route-finding algorithm may be limited to a maximum processing time and the tentative lowest value path 810 as of the expiration of the maximum processing time may be taken as the lowest value path 810 and/or may be designated as the interlace path 306 for the first instance. A first portion of vertices 602 may be visited when additively manufacturing an object 114 in the first instance, with a second portion of vertices 602 remaining unvisited. The first portion of vertices 602 may be added to the library of visited vertices 602. A next instance when the object 114 is additively manufactured, the route-finding algorithm may visit a third portion of vertices 602, and the third portion of visited vertices 602 may be added to the library of visited vertices 602. The third portion of visited vertices 602 may be a subset of the second portion of visited vertices 602. Over a series of instances of additively manufacturing an object 114, the library of visited vertices 602 may grow and the lowest value path 810 and/or the interlace path 306 may be refined.

Additionally, or in the alternative, a library of similar visited vertices 602 may be maintained. When processing a first object slice 300, a route-finding algorithm may be limited to a maximum processing time and the tentative lowest value path 810 as of the expiration of the maximum processing time may be taken as the lowest value path 810 for the first object slice 300 and/or may be designated as the interlace path 306 for the first object slice 300. A first portion of vertices 602 may be visited when processing the first object slice 300, with a second portion of vertices 602 remaining unvisited. A subsequent object slice 300 may have a plurality of similar vertices 602 relative to a preceding object slice 300, such as the first object slice 300. The first portion of vertices 602 visited by the route-finding algorithm may be added to the library of similar visited vertices 602. For example, vertices 602 from among the first portion of vertices 602 that have respective similar vertices 602 in a subsequent object slice 300 may be added to the library of similar vertices 602. When processing the subsequent object slice 300, the route-finding algorithm may utilize the values from the library of similar vertices 602. The respective similar vertices 602 of the subsequent object slice 300 may be marked as visited and the route-finding algorithm may utilize the weighting values from the library of similar vertices 602 without visiting the corresponding similar vertices 602 in the subsequent object slice 300. When processing the subsequent object slice 300, the route-finding algorithm may visit a third portion of vertices 602, and the third portion of visited vertices 602 may be added to the library of similar visited vertices 602. Over a series of object slices 300, the library of similar visited vertices 602 may grow and the lowest value path 810 and/or the interlace path 306 may be refined.

In some embodiments, a priority queue may be utilized. Vertices 602 that satisfy one or more prioritizing criterion may be added to the priority queue. The route-finding algorithm may visit vertices 602 in the priority queue before visiting other vertices 602. Additionally, or in the alternative, the route-finding algorithm may visit vertices 602 in order of priority. By way of example, vertices 602 may be assigned a priority based on weighting value and/or a location within an object slice 300. A vertex 602 may be assigned a priority based at least in part on whether the vertex 602 is located along a contour border 318 or within a contour zone 308. A vertex 602 within a contour zone 308 may be assigned a priority based at least in part on whether the vertex 602 is located within an interior contour zone 312 or a boundary contour zone 310. Vertices 602 located along a contour border 318 may be prioritized over vertices 602 located within a contour zone 308. Additionally, or in the alternative, vertices 602 may be prioritized over one another based at least in part on their respective proximity to a contour zone 308 and/or their respective proximity to an outer perimeter 314 and/or an interior perimeter 316. Vertices 602 may be prioritized over one another based at least in part on their respective proximity to a source vertex 710 and/or a destination vertex 712. Further, vertices 602 may be additionally or alternatively prioritized over one another based at least in part on their respective proximity to a midline 305 and/or a border 808 of an interlace region 154. As another example, vertices 602 may additionally or alternatively be prioritized over one another based at least in part on their relative proximity to an interlace path 306 determined for a preceding object slice 300 and/or for a previous object 114.

In some embodiments, a route-finding algorithm may utilize one or more heuristic functions h(n) to define an interlace path 306. The heuristic function may be configured to estimate the lowest value path 810 from a current vertex 602 to a destination vertex 712. A heuristic function may be configured to allow a route-finding algorithm to visit vertices 602 that are considered to have a higher likelihood of leading to a lowest value path 810. For example, one or more heuristic functions may be utilized to approximate one or more aspects of a lowest value path 810. A heuristic function may trade optimality, completeness, accuracy, or precision for processing time. By way of example, a best-first search algorithm (e.g., A* algorithm) may be configured to utilize one or more heuristic functions h(n).

In an exemplary embodiment, the route-finding algorithm may include an A* algorithm. The route-finding algorithm may be configured to define an interlace path 306 that minimized the function f(n)=g(n)+h(n), where n is the current vertex 602 on a path, h(n) is a heuristic function, g(n) is the actual value of the path from a source vertex 710 to the current vertex 602. The route-finding algorithm may maintain a tree or heap of paths originating at the source vertex 710 and extend the respective paths one edge at a time until a termination criterion is satisfied. The route-finding algorithm may determine which of the paths to extend based at least in part on the value of the path g(n) and a heuristic function h(n) configured to estimate the value required to extend the path all the way to the destination vertex 712. The route-finding algorithm may terminate when the path chosen to extend, when minimizing the function f(n)=g(n)+h(n), is a path from the source vertex 710 to the destination vertex 712, and/or if there are no paths eligible to be extended. A priority queue may be utilized to perform the repeated selection of minimum (estimated) value paths to expand. At respective step of the algorithm, the vertex 602 with the lowest f(n) value may be removed from the queue for processing. The f(n) and g(n) values of its neighboring vertices 602 may be updated accordingly, and these neighbors are added to the queue. The route-finding algorithm may continue until a goal vertex 602 has a lower f(n) value than any vertex 602 in the queue and/or until the queue is empty. The route-finding algorithm may keep track of the path to each vertex 602 from its predecessor on the lowest value path 810, for example, so that the route-finding algorithm may output the actual sequence of vertices 602 for the lowest value path 810. The destination vertex 712 may point to its predecessor vertex 602, and each sequential predecessor vertex 602 may point to its predecessor, until a vertex 602 points to the source vertex 710.

The heuristic function h(n) may include a heuristic interlace path and/or a heuristic contour zone. As an example, the heuristic interlace path may be determined based at least in part on an interlace path 306 for a previous object slice 300 and/or an interlace path 306 for a previously manufactured object 114. Additionally, or in the alternative, the heuristic interlace path may include, and/or may be determined based at least in part on, a midline 305 and/or a contour border 318. The heuristic interlace path may, additionally or alternatively, include and/or be based at least in part on a shortest distance between the source vertex 710 and the destination vertex 712.

The heuristic function h(n) may improve the route-finding algorithm's convergence on a lowest value path 810, while maintaining correctness, when the heuristic function h(n) is admissible. A heuristic function h(n) is admissible when h(n)>g(n) for every vertex 602, which means an admissible heuristic function h(n) never overestimates the true lowest value path 810 to a vertex 602, such as a destination vertex 712. Rather, an admissible heuristic function underestimates the actual value of the lowest value path 810. For an admissible heuristic function, h(n)=0 at the destination vertex 712. When a heuristic function h(n) underestimates the true lowest value path 810, the route-finding algorithm can be configured to utilize the heuristic function h(n) in a manner that is guaranteed to find the actual lowest value path 810. With a non-admissible heuristic, a route-finding algorithm might return a lowest value path 810 that is not the actual lowest value path 810.

An admissible heuristic may include and/or be based at least in part on a relaxed description of an estimated lowest value path 810. In some embodiments, an admissible heuristic may utilize and/or be based at least in part on a pattern database that stores exact solutions to partial paths within the lowest value path 810. Additionally, or in the alternative, an admissible heuristic may utilize and/or be based at least in part on one or more inductive learning methods.

In addition to being admissible, in some embodiments, the heuristic function h(n) may be consistent. A heuristic function h(n) is consistent when, for every vertex 602 and each successor vertex 602, the heuristic value upon reaching a destination vertex 712 is less than or equal to the sum of the incremental value upon reaching the successor vertex 602 and the heuristic value of reaching the destination vertex 712 from the successor vertex 602. A consistent heuristic function h(n) satisfies the following criteria: h(n)≤k(n,n')+h(n') AND h(d)=0, where h(n) is the heuristic value from a vertex to a destination vertex, k(n,n') is the incremental value from the vertex to a successor vertex, h(n') is the heuristic value from the successor vertex to the destination vertex, and h(d) is the heuristic value at the destination vertex. When a heuristic function h(n) is consistent, the route-finding algorithm can be configured to utilize the heuristic function h(n) in a manner that is guaranteed to find the actual lowest value path 810 without processing any vertex 602 more than once. A consistent heuristic is also an admissible heuristic. When a route-finding algorithm utilizes a consistent heuristic, the value of a solution path to a vertex 602 is the lowest possible value under the criteria considered by the route-finding algorithm.

In some embodiments, admissible criteria for a heuristic function h(n) may be relaxed such that a solution path determined by a route-finding algorithm is no worse than (1+ε) times the lowest value solution path. Such a relaxed heuristic function may be referred to as being ε-admissible, or as an ε-admissible heuristic function. While an admissible heuristic function h(n) returns a solution path that is the lowest value path 810, equally meritorious paths may exist. In some embodiments, it may be undesirable for a route-finding algorithm to consume additional processing time considering equally meritorious paths. The admissible criterion can be relaxed using an ε-admissible heuristic to reduce processing time while still assuring that the solution path is no worse than (1+ε) times the lowest value path 810.

The route-finding algorithm may additionally or alternatively utilize a memory-bounded search function and/or a pruning function. For example, a route-finding algorithm may utilize an Iterative deepening A* (IDA*) function and/or a memory bounded A* function such as a Simplified Memory Bounded A* (SMA*) function. A route-finding algorithm that utilizes an IDA* function may at each iteration, perform a depth-first search, and then prune a branch when its total value f(n)=g(n)+h(n) exceeds a threshold. The threshold may initially be an estimate of the value at an initial state. The threshold may increase for each iteration of the route-finding algorithm. At each iteration, the threshold used for the next iteration may be the minimum value of all values that exceeded the current threshold. A route-finding algorithm that utilizes an SMA* function may prune vertices 602 when expansion has revealed a less promising value than expected. An SMA* function may allow the route-finding algorithm to explore branches and backtrack to explore other branches.

In some embodiments, a route-finding algorithm may be configured to utilize one or more contraction hierarchies. A contraction hierarchy may be configured to allow the route-finding algorithm contract (e.g., reduce) the number of vertices 602 to be processed between a source vertex 710 and a destination vertex 712. A contraction hierarchy may be based at least in part on hierarchies of various portions of an object slice 300, such as contour zone 308 (e.g., boundary contour zones 310 and/or interior contour zones 312), contour borders 318, outer perimeters 314, and/or interior perimeter 316.

A contraction hierarchy may include a preprocessing phase and/or a query phase. Iterative contractions may be performed during the preprocessing phase, with a contraction candidate vertex, v, temporarily removed from the graph and a shortcut created between neighboring vertices $\{v_u, v_w\}$ when a witness search reveals that a lowest value path 810 from $v_u$ to $v_w$ includes the contraction candidate vertex, v. The contraction, or shortcut, reduces the number of edges in the graph. Bottom-up or top-down heuristics may be utilized to determine an order in which vertices 602 are considered for contraction.

A bottom-up heuristic may select a next contraction candidate vertex 602 after the previous contraction has been completed. The next contraction candidate vertex 602 may be selected based at least in part on the net number of edges added when contracting a vertex 602. The bottom-up heuristic may seek to minimize the number of shortcuts by reducing the number of edges in the graph, for example, by maintaining a counter for a plurality of vertices 602 and incrementing the counter when a neighboring vertex 602 is contracted, with vertices 602 that have a lower counter value being prioritized over vertices 602 width higher counters.

A top-down heuristic may utilize a vertex 602 ordering that has been precomputed before performing contractions. The vertices 602 may be ordered based at least in part on one or more nested dissections. A nested dissection may be used to determine how many potential lowest value paths 810 utilize a given vertex 602. Vertices 602 that are needed for a larger number of potential lowest value paths 810 may be prioritized over those needed for a smaller number of potential lowest value paths 810. By way of example, vertices 602 located along contour borders 318 may be prioritized over vertices 602 located within contour zones 308.

A contraction hierarchy may preprocess at least a portion of the vertices 602 between adjacent contour borders 318, such as between adjacent interior contour zones 312, and/or from a contour border 318 between an boundary contour zone 310 and an interior contour zone 312 to an adjacent contour border 318. Additionally, or in the alternative, a contraction hierarchy may preprocess at least a portion of the vertices 602 between an outer perimeter 314 and an adjacent contour border 318, and/or between an interior perimeter 316 and an adjacent contour border 318.

At the query phase of a contraction hierarchy, a bidirectional search may be performed. The bidirectional search may start from a source vertex 710 and a destination vertex 712 on the original graph, as augmented by the contractions created in the preprocessing phase. Following the query phase, the route-finding algorithm may determine the lowest value path 810 by recursively unpacking respective contracted vertices 602 in the contraction hierarchy.

In some embodiments, a highest priority vertex 602 on the lowest value path 810 between a source vertex 710 and a destination vertex 712 may be the source vertex 710, the destination vertex 712, or a vertex 602 with higher priority than both the source vertex 710 and the destination vertex 712. As such, a vertex, v, that minimizes the sum of: $f(v_s,v)+f(v,v_d)$ may be included on the lowest value path 810 from the in the original graph, where $f(v_s,v_u)$ is the value of the source vertex, $v_s$, to the vertex, v, and $f(v_u,v_d)$ is the value from the vertex, v, to the destination vertex $v_d$. When the sum of: $f(v_s,v)+f(v,v_d)$ is minimized, the following equality is satisfied: $f(v_s,v)+f(v,v_d)=f(v_s,v_d)$. As a result, both directions of the bidirectional search may contract only those edges leading to higher priority vertices 602 in the hierarchy, which allows for a relatively small search space. By way of example, in some embodiments, a source vertex 710 may be located at a first outer perimeter 314, a destination vertex 712 may be located at a second outer perimeter 314, and a higher priority vertex may be located at a contour border 318 between the source vertex 710 and the destination vertex 712. Additionally, or in the alternative, a source vertex 710 may be located at a first contour border 318, a destination vertex 712 may be located at a second contour border 318, and a higher priority vertex 602 may be located at a contour border 318 between the first contour border 318 and the second contour border 318. In some embodiments, the first contour border 318 may be adjacent to a first outer perimeter 314, and/or the second contour border 318 may be adjacent to a second outer perimeter 314.

In some embodiments, a route-finding algorithm may utilize heaps and/or trees. A heap is a tree-based data structure in which all the vertices 602 of the tree have a specific order. If there are N vertices 602 in a queue, and each vertex 602 has a respective weight, a heap may be used to prioritize the N vertices 602 in the queue, such that higher priority vertices 602 will be visited before others. As vertices 602 are visited, neighboring vertices 602 may be added to the heap.

A lowest weight tree may be used to traverse vertices 602 in the interlace region 154. Heap may be used to store the vertices 602 not yet included in the lowest weight tree. For example, a minimum heap may be used as a priority queue to get the minimum weight vertex 602 from the set of vertices 602 not yet included in the lowest weight tree.

One or more heaps may be assigned to particular portions of interlace region 154, such as to resolve particular portions of concern. Any desired implementation of a heap may be utilized, including a binary heap, a binomial heap, a Fibonacci heap, and so forth. In some embodiments, one or more heaps may be utilized in combination with a contraction hierarchy. In some embodiments, a route-finding algorithm may perform a search, such as a multi-directional search from a plurality of vertices 602, of one or more heaps. For example, a multi-directional search may be performed using a plurality of heaps and/or contraction hierarchies respectively corresponding to a plurality of contour borders 318. Binomial heaps and/or mergeable heaps may be utilized, for example, to allow pairs of heaps to be merged together.

By way of example, a heap may be assigned to a boundary contour zone 310 and/or an interior contour zone 312 adjacent to the boundary contour zone 310. Such a heap may be utilized, for example, to determine a source vertex 710 and/or at least a portion of a lowest value path 810 between a source vertex 710 and a vertex 602 corresponding to a contour border 318 adjacent to the boundary contour zone 310 corresponding to the destination vertex 712. Additionally, or in the alternative, a heap may be utilized to determine a destination vertex 712 and/or at least a portion of a lowest value path 810 between a destination vertex 712 and a vertex 602 corresponding to a contour border 318 adjacent to the boundary contour zone 310 corresponding to the destination vertex 712. In some embodiments, a heap may be utilized to determine at least a portion of a lowest value path 810 between adjacent contour borders 318 and/or intersecting contour borders 318. A heap may additionally or alternatively be utilized to determine a 810 around feature of an object slice 300 that may be designated as non-traversable interlace path 306 and/or a feature of an object slice 300 designated as preferentially avoided by an interlace path 306. For example, a heap may be utilized to determine a lowest value path 810 around a boundary contour zone 310 delimited by an interior perimeter 316.

Figure 10A:
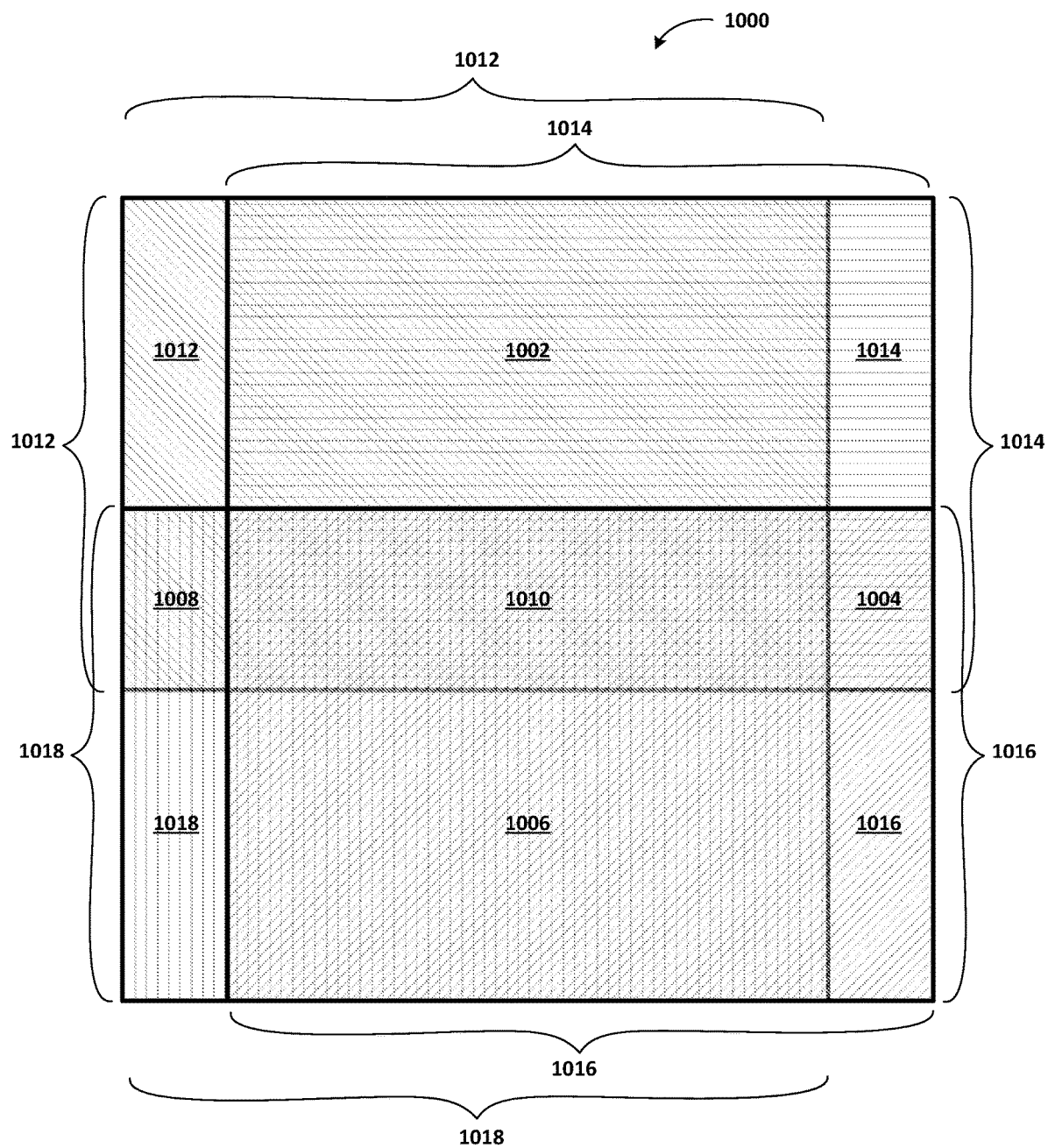
FIG. 10A schematically depicts an exemplary build plan that includes a plurality of interlace regions.
Figure 10B:
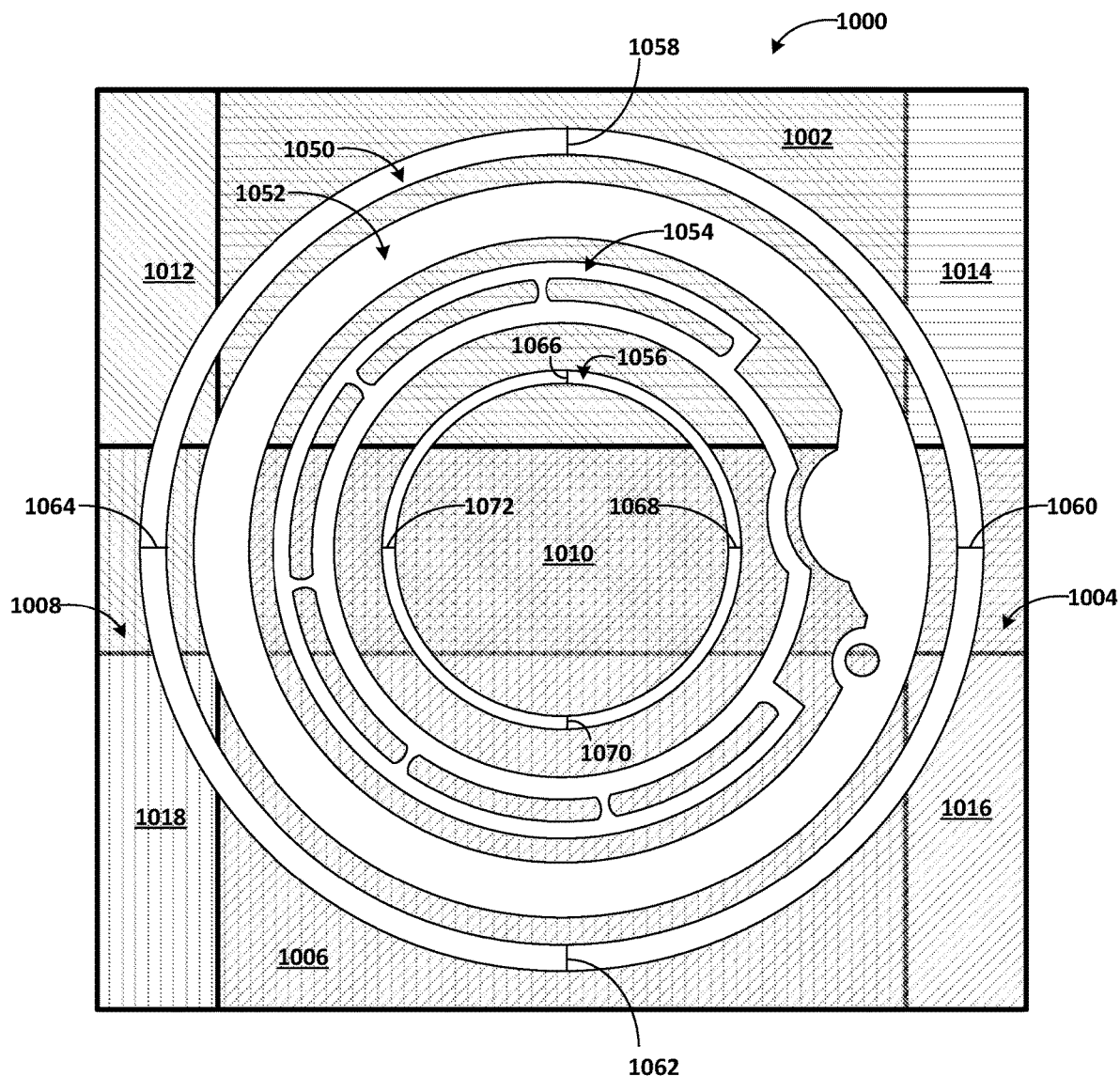

Now turning to FIGS. 10A and 10B, another exemplary build plane 1000 is shown that includes a plurality of interlace regions 154. The build plane 1000 shown in FIGS. 10A and 10B may correspond to an additive manufacturing system 100 and/or an additive manufacturing machine 102 that is configured to irradiate a build plane 1000 with at least two energy beams and/or with at least four energy beams. The build plane 1000 shown in FIG. 10A includes a first interlace region 1002, a second interlace region 1004, a third interlace region 1006, a fourth interlace region 1008, and/or a fifth interlace region 1010.

The first interlace region 1002 represents the overlapping portion of a first build plane region 1012 and a second build plane region 1014. The first build plane region 1012 corresponds to a scan field of a first energy beam from a first irradiation device. The second build plane region 1014 corresponds to a scan field of a second energy beam 148 from a second irradiation device 140. The second interlace region 1004 represents the overlapping portion of the second build plane region 1014 and a third build plane region 1016. The third build plane region 1016 corresponds to a scan field of a third energy beam from a third irradiation device. The third interlace region 1006 represents the overlapping portion of the third build plane region 1016 and a fourth build plane region 1018. The fourth build plane region 1018 corresponds to a scan field of a fourth energy beam from a fourth irradiation device. The fourth interlace region 1008 represents the overlapping portion of the fourth build plane region 1018 and the first build plane region 1012. The fifth interlace region 1010 represents the overlapping portion of the first build plane region 1012, the second build plane region 1014, the third build plane region 1016, and the fourth build plane region 1018.

In some embodiments, an interlace path 306 may be determined for the first interlace region 1002, the second interlace region 1004, the third interlace region 1006, the fourth interlace region 1008, and/or the fifth interlace region 1010. For example, as shown in FIG. 10B, an object slice 300 may overlap a plurality of interlace regions (e.g., the first interlace region 1002, the second interlace region 1004, the third interlace region 1006, the fourth interlace region 1008, and/or the fifth interlace region 1010). An object slice 300 may include a plurality of segments. For example, as shown in FIG. 10B, an object slice 300 may include a first segment 1050, a second segment 1052, a third segment 1054, and/or a fourth segment 1056. An interlace path 306 may be determined with respect to a plurality of segments, such as the first segment 1050, the second segment 1052, the third segment 1054, and/or the fourth segment 1056.

The respective interlace paths 306 may correspond to one or more of the plurality of energy beams. For example, the first segment 1050 may include a first interlace path 1058 with respect to the first interlace region 1002, a second interlace path 1060 with respect to the second interlace region 1004, a third interlace path 1062 with respect to the third interlace region 1006, and a fourth interlace path 1064 with respect to the fourth interlace region 1008. Additionally, or in the alternative, the third segment 1054 may include a fifth interlace path 1066 with respect to the first interlace region 1002, a sixth interlace path 1068 with respect to the fifth interlace region 1010, a seventh interlace path 1070 with respect to the third interlace region 1006, and an eighth interlace path 1072 with respect to the fifth interlace region 1010.

The first interlace path 1058 and/or the fifth interlace path 1066 may respectively delineate a first interlacing boundary and/or a fifth interlacing boundary between the first energy beam and the second energy beam 148. The second interlace path 1060 may delineate a second interlacing boundary between the second energy beam 148 and the third energy beam. The third interlace path 1062 and/or the seventh interlace path 1070 may respectively delineate a third interlacing boundary and/or a seventh interlacing boundary between the third energy beam and the fourth energy beam. The fourth interlace path 1064 may delineate a fourth interlacing boundary between the fourth energy beam and the first energy beam. The sixth interlace path 1068 and/or the eighth interlace path 1072 may respectively delineate a sixth interlacing boundary and/or an eighth interlacing boundary. The sixth interlacing boundary and/or the eighth interlacing boundary correspond to any combination of at least two of: the first energy beam, the second energy beam 148, the third energy beam, and/or the fourth energy beam.

In some embodiments a route-finding algorithm may be used to determine a plurality of interlace paths 306, such as a plurality of interlace paths 306 corresponding to the interlace regions 154 shown in FIGS. 10A and 10B. The route-finding algorithm may determine a lowest value path 810 for one or more of a plurality of interlace paths 306, and one or more of the plurality of interlace paths 306 may be based at least in part on the respective lowest value path 810.

Figure 11A:
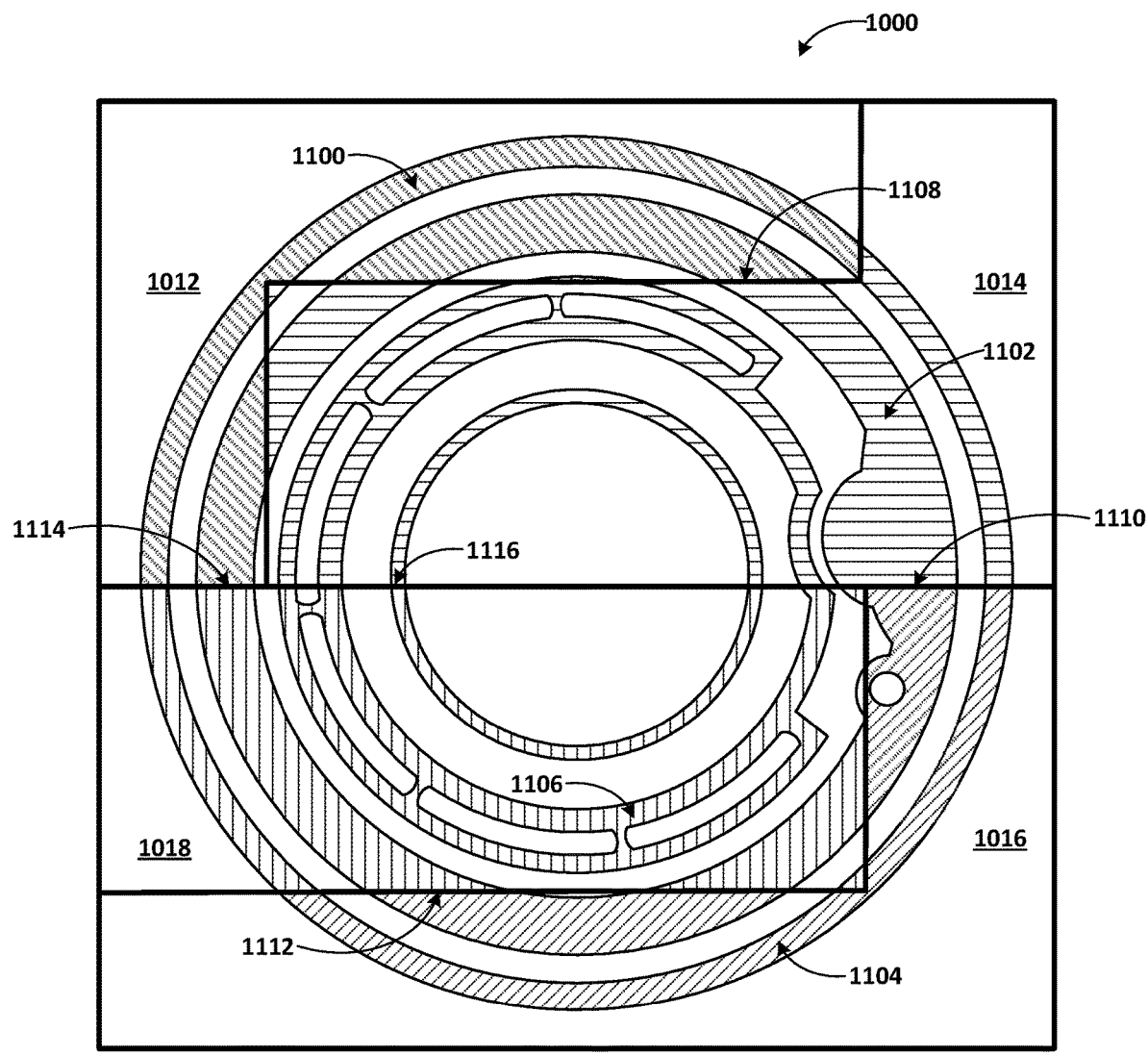
FIG. 11A schematically depicts exemplary heuristic contour zones for the object slice and build plane of FIGS. 10A-10B.

Now turning to FIGS. 11A and 11B, determination of exemplary interlace paths 306 for the object slice 300 shown in FIGS. 10A and 10B will be described. Referring to FIG. 11A, in some embodiments, one or more heuristic functions $h(n)$ may be utilized. For example, one or more heuristic functions $h(n)$ may be utilized to define heuristic contour zones corresponding to the respective build plane regions. As shown, one or more heuristic functions $h(n)$ may be utilized to define a first heuristic contour zone 1100 corresponding to the first build plane region 1012, a second heuristic contour zone 1102 corresponding to the second build plane region 1014, a third heuristic contour zone 1104 corresponding to the third build plane region 1016, and/or a fourth heuristic contour zone 1106 corresponding to the fourth build plane region 1018.

The one or more heuristic functions $h(n)$ may define one or more heuristic interlace paths. For example, a first heuristic interlace path 1108 may delineate a first heuristic interlacing boundary between the first energy beam and the second energy beam 148, a second heuristic interlace path 1110 may delineate a second heuristic interlacing boundary between the second energy beam 148 and the third energy beam, a third heuristic interlace path 1112 may delineate a third heuristic interlacing boundary between the third energy beam and the fourth energy beam, a fourth heuristic interlace path 1114 may delineate a fourth heuristic interlacing boundary between the fourth energy beam and the first energy beam, and/or a fifth heuristic interlace path 1116 may delineate a fifth heuristic interlacing boundary between the second energy beam 148 and the fourth energy beam.

In some embodiments, the one or more heuristic functions $h(n)$ may be determined based at least in part on one or more heuristics corresponding to surface area of the object slice 300 and/or irradiation time of the respective energy beams. Additionally, or in the alternative, the one or more heuristic functions $h(n)$ may be determined based at least in part on one or more heuristics corresponding to a shortest distance for an interlace path 306 and/or a shortest aggregate distance of all interlace paths 306. Various heuristic functions $h(n)$ may be selected individually, or in combination, based at least in part on desired properties. For example, a heuristic function $h(n)$ may be selected that prioritizes equivalent allocation of surface area and/or scanning among at least some of the energy beams. Additionally, or in the alternative, a heuristic function $h(n)$ may be selected that prioritizes a shortest distance for one or more interlace paths 306 and/or a shortest aggregate distance for a plurality of interlace paths 306. Weighting values may be assigned to a plurality of selected heuristics, for example, when selected in combination, such as to assign relative priorities to a plurality of criteria.

Figure 11B:
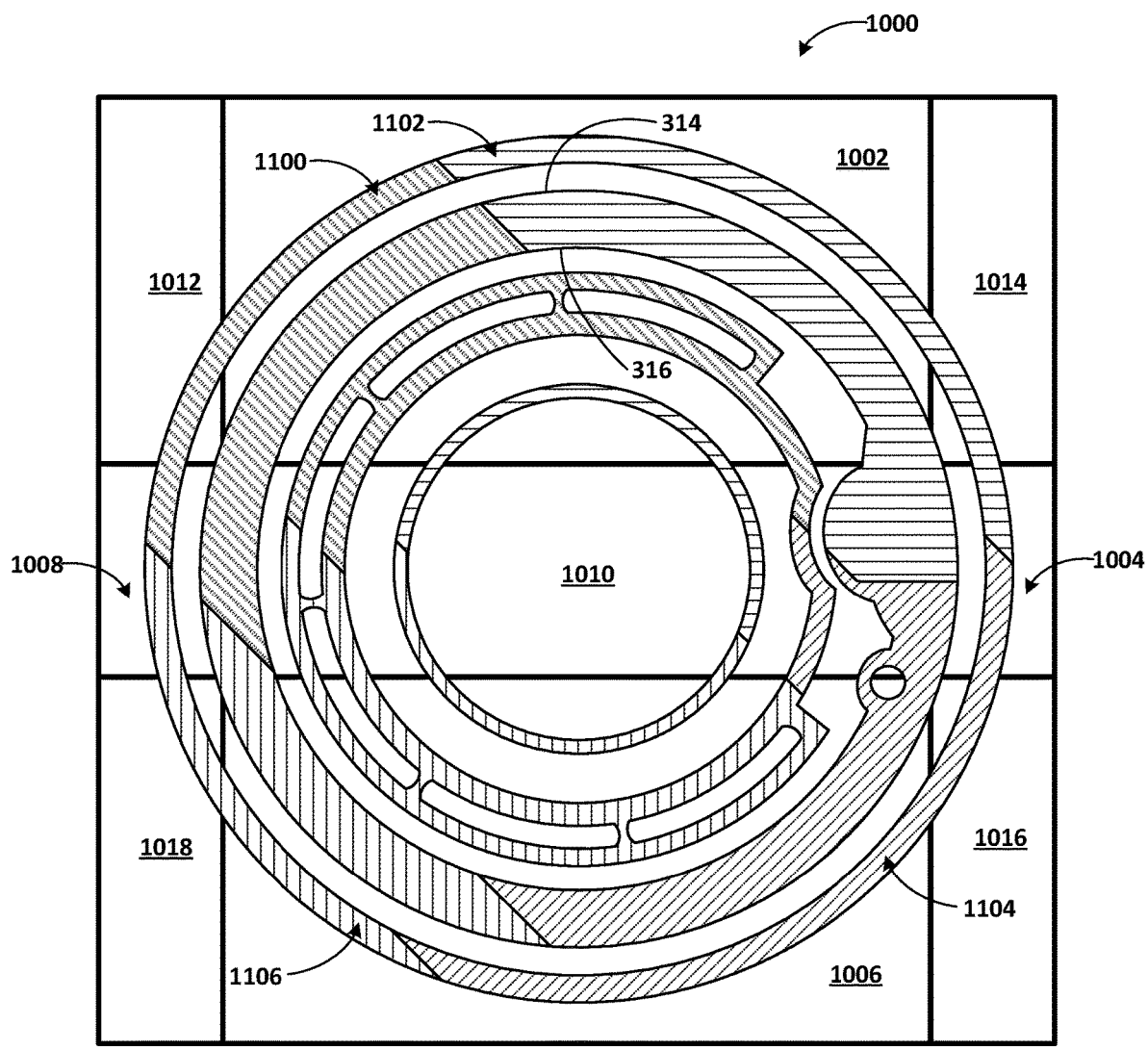
FIG. 11B schematically depicts exemplary contour zones and corresponding interlace paths for the for the object slice and build plane of FIGS. 10A-10B.

FIG. 11B shows an illustrative allocation of a plurality of contour zones and locations of a corresponding plurality of interlace paths 306. The contour zones and interlace paths 306 shown in FIG. 11B differ from those shown in FIGS. 10B and 11A in order to illustrate a potential output of one or more route-finding algorithms. In some embodiments, a route-finding algorithm may utilize one or more heuristic functions such as the heuristic functions described with reference to FIG. 11A. The contour zones and interlace paths 306 may be determined using one or more heuristic functions h(n), such one or more heuristic functions h(n) that include one or more heuristic contour zone and/or one or more heuristic interlace paths 306. In some embodiments, the respective contour zones and corresponding interlace paths 306 may provide a balance of a plurality of parameters, such as one or more irradiation parameters, one or more object parameters, and/or one or more production parameters. For example, the respective contour zones and corresponding interlace paths 306 may balance a production parameter with an object parameter. Additionally or in the alternative, the respective contour zones and corresponding interlace paths 306 may balance an irradiation parameter with an object parameter, and/or an irradiation parameter with a production parameter. The production parameter may be or include one or more of irradiation time, processing time, and/or allocation of irradiation time and/or processing time between respective irradiation devise of an energy beam system 134. The object parameter may be or include energy density, melt pool size, temperature, material density, consolidation pattern, and/or crystalline structure. The irradiation parameter may be or include scanning speed, scanning time, beam spot size, and/or energy density.

Figure 12:
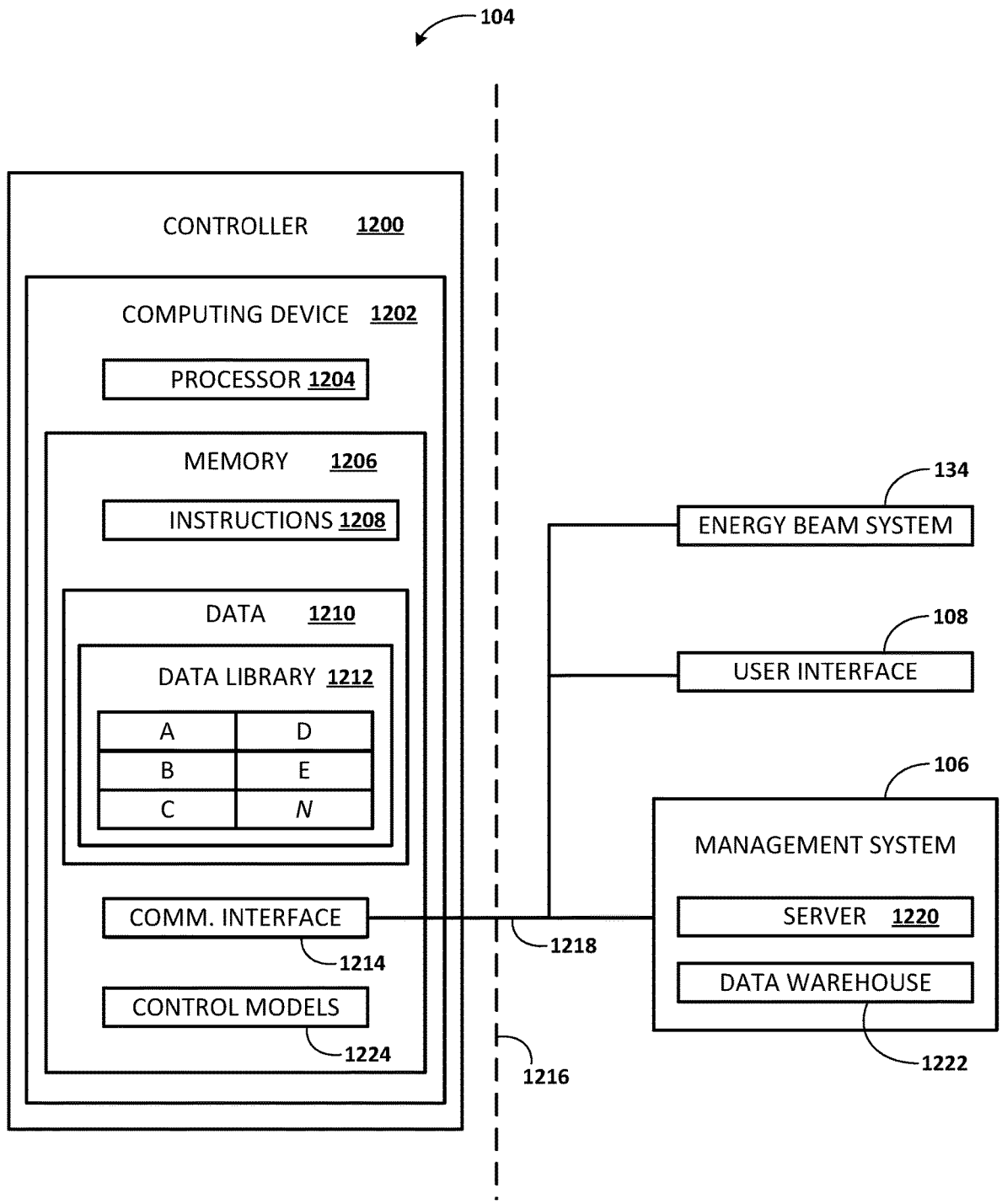
FIG. 12 schematically depicts an exemplary control system that may be configured for use with an additive manufacturing system or machine.

Now turning to FIG. 12, and exemplary control system 104 will be described. An exemplary control system 104 includes a controller 1200 communicatively coupled with an additive manufacturing machine 102. For example, the controller 1200 may be communicatively coupled with a management system 106 and/or an energy beam system 134. The controller 1200 may also be communicatively coupled with a user interface 108. The controller 1200 may include one or more computing devices 1202, which may be located locally or remotely relative to the additive manufacturing machine 102. The one or more computing devices 1202 may include one or more processors 1204 and one or more memory devices 1206. The one or more processors 1204 may include any suitable processing device, such as a microprocessor, microcontroller, integrated circuit, logic device, and/or other suitable processing device. The one or more memory devices 1206 may include one or more computer-readable media, including but not limited to non-transitory computer-readable media, RAM, ROM, hard drives, flash drives, and/or other memory devices 1206.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 1206 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 1206 may store information accessible by the one or more processors 1204, including computer-executable instructions 1208 that can be executed by the one or more processors 1204. The instructions 1208 may include any set of instructions which when executed by the one or more processors 1204 cause the one or more processors 1204 to perform operations. In some embodiments, the instructions 1208 may be configured to cause the one or more processors 1204 to perform operations for which the controller 1200 and/or the one or more computing devices 1202 are configured.

The memory devices 1206 may store data 1210 accessible by the one or more processors 1204. The data 1210 can include current or real-time data, past data, or a combination thereof. The data 1210 may be stored in a data library 1212. As examples, the data 1210 may include data 1210 associated with or generated by an additive manufacturing system 100, including data 1210 associated with or generated by a controller 1200, an additive manufacturing machine 102, a user interface 108, a management system 106, and/or a computing device 1202. The data 1210 may also include other data sets, parameters, outputs, information, associated with an additive manufacturing system 100, such as those associated with the additive manufacturing machine 102, the user interface 108, and/or the management system 106.

The one or more computing devices 1202 may also include a communication interface 1214, which may be used for communications with a communication network 1216 via wired or wireless communication lines 1218. The communication interface 1214 may include any suitable components for interfacing with one or more network(s), including for example, transmitters, receivers, ports, controllers, antennas, and/or other suitable components. The communication interface 1214 may allow the computing device 1202 to communicate with the additive manufacturing machine 102. The communication network 1216 may include, for example, a local area network (LAN), a wide area network (WAN), SATCOM network, VHF network, a HF network, a Wi-Fi network, a WiMAX network, a gatelink network, and/or any other suitable communication network 1216 for transmitting messages to and/or from the controller 1200 across the communication lines 1218. The communication lines 1218 of communication network 1216 may include a data bus or a combination of wired and/or wireless communication links.

The communication interface 1214 may additionally or alternatively allow the computing device 1202 to communicate with a user interface 108 and/or a management system 106. The management system 106 may include a server 1220 and/or a data warehouse 1222. As an example, at least a portion of the data 1210 may be stored in the data warehouse 1222, and the server 1220 may be configured to transmit data 1210 from the data warehouse 1222 to the computing device 1202, and/or to receive data 1210 from the computing device 1202 and to store the received data 1210 in the data warehouse 1222 for further purposes. The server 1220 and/or the data warehouse 1222 may be implemented as part of a control system 104.

The controller 1200 may include one or more route-finding models 1224, which may utilize the data 1210, including the data library 1212, and/or other data sets, parameters, outputs, information, associated with the additive manufacturing system 100, such as those associated with the additive manufacturing machine 102, the user interface 108, and/or the management system 106. The one or more route-finding models 1224 may additionally or alternatively utilize data 1210 from the data warehouse 1222, which may be transmitted to the controller 1200 from the server 1220. The control system 104 may be configured to determine a plurality of contour zones 308 for an object slice 300 and/or to determine one or more corresponding interlace paths 306 for an object slice 300 in accordance with the present disclosure. For example, the controls system may include one or more route-finding models 1224 configured to define an interlace path 306 and/or corresponding contour zones 308 in accordance with the present disclosure. The control system 104 may be configured to output one or more control command based at least in part on the plurality of contour zones 308 for the object slice 300 and/or the one or more corresponding interlace paths 306 for an object slice 300. The one or more control commands may be configured to cause an energy beam system 134 to irradiate a layer of a powder bed 136 with the plurality of energy beams.

Further aspects of the invention are provided by the subject matter of the following clauses:

1. A method of additively manufacturing an object, the method comprising: defining an interlace path for a plurality of energy beams from an energy beam system based at least in part on a route-finding algorithm, the interlace path delineating a first contour zone of a build plane assigned to a first one of the plurality of energy beams from a second contour zone of the build plane assigned to a second one of the plurality of energy beams; and outputting a control command based at least in part on the interlace path, the control command configured to cause the energy beam system to irradiate a layer of a powder bed with the plurality of energy beams.
2. The method of any preceding clause, wherein the method further comprises: irradiating a layer of a powder bed with the plurality of energy beams based at least in part on the control command, the first contour zone being irradiated by the first one of the plurality of energy beams and the second contour zone being irradiated by the second one of the plurality of energy beams.
3. The method of any preceding clause, wherein at least a portion of the interlace path follows and/or defines a contour border.
4. The method of any preceding clause, wherein at least a portion of the interlace path traverses a contour zone.
5. The method of any preceding clause, wherein the route-finding algorithm is configured to determine a lowest value path between a source vertex and a destination vertex.
6. The method of any preceding clause, wherein the route-finding algorithm comprises a best-first algorithm, a depth-first algorithm, a breadth-first algorithm, a uniform value algorithm, and/or a greedy algorithm.
7. The method of any preceding clause, wherein the route-finding algorithm is configured to determine a lowest value path from an array of vertices corresponding to a build file executable by an additive manufacturing machine.
8. The method of any preceding clause, wherein respective vertices in the array of vertices are connected by edges that have weighting value determined based at least in part on one or more irradiation parameters, one or more object parameters, and/or one or more production parameters.
9. The method of any preceding clause, wherein at least some of the vertices in the array are assigned a priority based at least in part on whether the respective vertex is located along a contour border and/or within a contour zone.
10. The method of any preceding clause, wherein the route-finding algorithm is configured to determine a lowest value path based at least in part on a heuristic function.
11. The method of any preceding clause, wherein the heuristic function is admissible.
12. The method of any preceding clause, wherein the heuristic function is determined based at least in part on a midline and/or a contour border.
13. The method of any preceding clause, wherein the route-finding algorithm is configured to utilize a contraction hierarchy.
14. The method of any preceding clause, wherein the contraction hierarchy is configured to preprocess at least a portion of the vertices between adjacent contour borders, and/or wherein the contraction hierarchy is configured to preprocess at least a portion of the vertices from a contour border between an boundary contour zone and an interior contour zone to an adjacent contour border.
15. The method of any preceding clause, wherein the route-finding algorithm is configured to search a heap assigned to a contour border and/or to search a heap assigned to a contour zone.
16. The method of any preceding clause, wherein the route-finding algorithm is configured to balance one or more irradiation parameters, one or more object parameters, and/or one or more production parameters.
17. An additive manufacturing system, the system comprising: an additive manufacturing machine; and a control system, wherein the control system is configured to: define an interlace path for a plurality of energy beams based at least in part on a route-finding algorithm, the interlace path delineating a first contour zone of a build plane assigned to a first one of the plurality of energy beams from a second contour zone of the build plane assigned to a second one of the plurality of energy beams; and output a control command based at least in part on the interlace path, the control command configured to cause an energy beam system to irradiate a layer of a powder bed with the plurality of energy beams.

18. The additive manufacturing system of any preceding clause, wherein the additive manufacturing machine comprises the energy beam system, and wherein the energy beam system is configured to irradiate a build plane using at least two energy beams and/or at least four energy beams.

19. The additive manufacturing system of any preceding clause, wherein the control system is configured to define an interlace path based at least in part on a heuristic function, the one or more heuristic function comprising a heuristic contour zone and/or a heuristic interlace path.

20. The additive manufacturing system of any preceding clause, wherein the additive manufacturing system is configured to perform the method of any preceding clause.

21. A computer-readable medium comprising computer-executable instructions, which when executed by a processor, cause the processor to perform a method of additively manufacturing an object, the method comprising: defining an interlace path for a plurality of energy beams from an energy beam system based at least in part on a route-finding algorithm, the interlace path delineating a first contour zone of a build plane assigned to a first one of the plurality of energy beams from a second contour zone of the build plane assigned to a second one of the plurality of energy beams; and outputting a control command based at least in part on the interlace path, the control command configured to cause the energy beam system to irradiate a layer of a powder bed with the plurality of energy beams.

22. The computer-readable medium of any preceding clause, comprising computer-executable instructions, which when executed by a processor, cause the processor to perform the method of any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A non-transitory computer-readable medium comprising computer-executable instructions, which when executed by a processor, cause the processor to perform a method of additively manufacturing an object, the method comprising:
defining an interlace path for a plurality of energy beams from an energy beam system based at least in part on a route-finding algorithm, the interlace path delineating a first contour zone of a build plane assigned to a first one of the plurality of energy beams from a second contour zone of the build plane assigned to a second one of the plurality of energy beams; and
outputting a control command based at least in part on the interlace path, the control command configured to cause the energy beam system to irradiate a layer of a powder bed with the plurality of energy beams.

2. The non-transitory computer-readable medium of claim 1, wherein the computer-executable instructions, when executed by a processor, cause the processor to further perform the method of additively manufacturing the object, the method further comprising:
irradiating the layer of the powder bed with the plurality of energy beams based at least in part on the control command, the first contour zone being irradiated by the first one of the plurality of energy beams and the second contour zone being irradiated by the second one of the plurality of energy beams.

3. The non-transitory computer-readable medium of claim 1, wherein at least a portion of the interlace path follows and/or defines a contour border.

4. The non-transitory computer-readable medium of claim 1, wherein at least a portion of the interlace path traverses a contour zone.

5. The non-transitory computer-readable medium of claim 1, wherein the route-finding algorithm is configured to determine a lowest value path between a source vertex and a destination vertex.

6. The non-transitory computer-readable medium of claim 1, wherein the route-finding algorithm comprises a best-first algorithm, a depth-first algorithm, a breadth-first algorithm, a uniform value algorithm, and/or a greedy algorithm.

7. The non-transitory computer-readable medium of claim 1, wherein the route-finding algorithm is configured to determine a lowest value path from an array of vertices corresponding to a build file executable by an additive manufacturing machine.

8. The non-transitory computer-readable medium of claim 7, wherein respective vertices in the array of vertices are connected by edges that have a weighting value determined based at least in part on one or more irradiation parameters, one or more object parameters, and/or one or more production parameters.

9. The non-transitory computer-readable medium of claim 7, wherein at least some of the vertices in the array are assigned a priority based at least in part on whether the respective vertex is located along a contour border and/or within a contour zone.

10. The non-transitory computer-readable medium of claim 7, wherein the route-finding algorithm is configured to determine a lowest value path based at least in part on a heuristic function.

11. The non-transitory computer-readable medium of claim 10, wherein the heuristic function is admissible.

12. The non-transitory computer-readable medium of claim 11, wherein the heuristic function is determined based at least in part on a midline and/or a contour border.

13. The non-transitory computer-readable medium of claim 7, wherein the route-finding algorithm is configured to utilize a contraction hierarchy.

14. The non-transitory computer-readable medium of claim 13, wherein the contraction hierarchy is configured to preprocess at least a portion of the vertices between adjacent contour borders, and/or wherein the contraction hierarchy is configured to preprocess at least a portion of the vertices from a contour border between an boundary contour zone and an interior contour zone to an adjacent contour border.

15. The non-transitory computer-readable medium of claim 1, wherein the route-finding algorithm is configured to search a heap assigned to a contour border and/or to search a heap assigned to a contour zone.

16. The non-transitory computer-readable medium of claim 1, wherein the route-finding algorithm is configured to balance one or more irradiation parameters, one or more object parameters, and/or one or more production parameters.

17. An additive manufacturing system, the system comprising:
an additive manufacturing machine; and
a control system, wherein the control system is configured to perform a method of additively manufacturing an object, the method comprising:
defining an interlace path for a plurality of energy beams based at least in part on a route-finding algorithm, the interlace path delineating a first contour zone of a build plane assigned to a first one of the plurality of energy beams from a second contour zone of the build plane assigned to a second one of the plurality of energy beams; and
outputting a control command based at least in part on the interlace path, the control command configured to cause an energy beam system to irradiate a layer of a powder bed with the plurality of energy beams.

18. The additive manufacturing system of claim 17, wherein the additive manufacturing machine comprises the energy beam system, and wherein the energy beam system is configured to irradiate a build plane using at least two energy beams and/or at least four energy beams.

19. The additive manufacturing system of claim 17, wherein the control system is configured to define an interlace path based at least in part on a heuristic function, the heuristic function comprising a heuristic contour zone and/or a heuristic interlace path.

20. A method of additively manufacturing an object, the method comprising:
defining an interlace path for a plurality of energy beams from an energy beam system based at least in part on a route-finding algorithm, the interlace path delineating a first contour zone of a build plane assigned to a first one of the plurality of energy beams from a second contour zone of the build plane assigned to a second one of the plurality of energy beams; and
outputting a control command based at least in part on the interlace path, the control command configured to cause the energy beam system to irradiate a layer of a powder bed with the plurality of energy beams.

* * * * *